United States Patent
Zhang et al.

(10) Patent No.: US 10,495,794 B2
(45) Date of Patent: Dec. 3, 2019

(54) POLARIZATION INSENSITIVE OPTICAL PHASED ARRAY AND ASSOCIATED METHOD

(71) Applicants: Chunshu Zhang, Ottawa (CA); Eric Bernier, Kanata (CA); Dominic John Goodwill, Ottawa (CA)

(72) Inventors: Chunshu Zhang, Ottawa (CA); Eric Bernier, Kanata (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 15/838,498

(22) Filed: Dec. 12, 2017

(65) Prior Publication Data

US 2019/0179064 A1    Jun. 13, 2019

(51) Int. Cl.
| | |
|---|---|
| *H04B 15/00* | (2006.01) |
| *G02B 5/18* | (2006.01) |
| *G02F 1/29* | (2006.01) |
| *G01S 17/10* | (2006.01) |

(52) U.S. Cl.
CPC ............ *G02B 5/1885* (2013.01); *G01S 17/10* (2013.01); *G02F 1/292* (2013.01); *H04B 15/00* (2013.01); *G02F 2203/07* (2013.01); *G02F 2203/50* (2013.01)

(58) Field of Classification Search
USPC .......................................................... 385/3
See application file for complete search history.

(56) References Cited

U.S. PATENT DOCUMENTS

| | | | |
|---|---|---|---|
| 2006/0067699 A1* | 3/2006 | Chandrasekhar .. | H04B 10/2513 398/147 |
| 2012/0275362 A1* | 11/2012 | Park ...................... | H04W 74/02 370/311 |
| 2014/0192394 A1 | 7/2014 | Sun et al. | |

(Continued)

FOREIGN PATENT DOCUMENTS

| | | |
|---|---|---|
| CN | 101216578 A | 7/2008 |
| CN | 104459881 A | 3/2015 |

(Continued)

OTHER PUBLICATIONS

D. Kwong, et al, On-chip silicon optical phased array for two-dimensional beam steering, Opt. Letter, 39 (4), 941, 2014.

(Continued)

*Primary Examiner* — Eric Wong

(57) ABSTRACT

A polarization insensitive optical phased array is provided, for LIDAR or other purposes. A polarization rotator splitter or two-dimensional grating coupler provides two components of co-polarized (e.g. TE-polarized) light. Each component can be routed to a separate optical phased array (OPA) component, and light output of one of the OPA components is rotated in polarization by use of a half wave plate. A polarization controller can receive and control the two components of co-polarized light and then passes the controlled light to the two OPA components. A single OPA component can also be used along with a controller which combines the two components of co-polarized light into a single output, passed to the single OPA component.

28 Claims, 19 Drawing Sheets

(56) References Cited

U.S. PATENT DOCUMENTS

2017/0299697 A1    10/2017    Swanson

FOREIGN PATENT DOCUMENTS

CN        105026970 A    11/2015
JP       2017187649 A    10/2017

OTHER PUBLICATIONS

J. Sun, et al, "Large-scale nanophotonic phased array", Nature 493, 195-199, 2013.
K. A. Acoleyen, et al., "Off-chip beam steering with a one-dimensional optical phased array on silicon-on-insulator", Opt. Letter, 34(9), 1477, 2009.
Komljenovic et al. "Sparse Aperiodic Arrays for Optical Beam Forming and LIDAR", Optics Express, vol. 25, No. 3, Feb. 2017.
Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014).
G. Roelkens, D. Vermeulen, S. Selvaraja, R. Halir, W. Bogaerts, and D. Van Thourhout, "Grating-Based Optical Fiber Interfaces for Silicon-on-Insulator Photonic Integrated Circuits," IEEE Journal of Selected Topics in Quantum Electronics, vol. 17, No. 3, May/Jun. 2011.
J. Niklas Caspers et al., "Active Polarization Independent Coupling to Silicon Photonics Circuit", Proc. SPIE 9133, Silicon Photonics and Photonic Integrated Circuits IV, 91330G (May 1, 2014).

\* cited by examiner

POLARIZATION INSENSITIVE OPTICAL PHASED ARRAY AND ASSOCIATED METHOD

FIELD OF THE INVENTION

The present invention pertains to the field of optical devices and in particular to optical phased arrays and associated methods.

BACKGROUND

An Optical Phased Array (OPA) consists of multiple optical antennas, with each antenna emitting or accepting light of a particular amplitude and phase. The OPA can be used for a variety of purposes, such as a Light Detection and Ranging (LIDAR) apparatus. The OPA based LIDAR can exhibit flexible beam steering, beam forming, and multiple beam generation, which can be useful in a variety of applications, such as but not limited to autonomous vehicles. The OPA may be used as a transmitting beam-former, wherein the OPA is controlled such that the emissions form a desired far-field radiation pattern through interference.

OPAs can be realized using a photonic integrated circuit (PIC) platform (such as but not necessarily limited to a Silicon on Insulator (SOI) platform), in which the OPA components are formed on a substrate comprising optical waveguides. An example OPA of this type is described in "Sparse Aperiodic Arrays for Optical Beam Forming and LIDAR," Komljenovic et al., Optics Express, Vol. 25, No. 3, February 2017, hereinafter referred to as Komljenovic, and in particular FIG. 1 of Komljenovic. However, the required optical components (including passive and active elements) in such a realization are often polarization dependent. For example, Komljenovic describes an OPA having a steering direction that depends upon an index of refraction, but uses SOI having silicon thickness of 220 nm to 500 nm and partially etched waveguides, which are well-known to persons skilled in the art to have a refractive index that depends strongly upon polarization. This means that for proper operation, the light provided to these components must be primarily of a particular polarization.

To address this issue, current OPAs typically receive input light which is preconfigured to the desired polarization prior to delivery to the PIC. For example, the input light can be generated away from the PIC platform with the desired polarization, and then transmitted to the PIC platform OPA input using a polarization maintaining (PM) fiber.

However, the use of polarization maintaining transmission media for connecting the OPA to the external polarization-controlled light source generally increases system cost and complexity. It would therefore be desirable to provide an OPA that is operable with a more generic light source, such as a generic fiber laser or another source of light with undefined polarization, wherein the undefined polarization may be static or may be time-varying.

Therefore there is a need for an OPA and associated method that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a polarization insensitive OPA and associated methods. In accordance with embodiments of the present invention, an optical phased array apparatus is provided. The apparatus includes a polarization splitting coupler (PSC), a first optical phased array (OPA) component, and a second OPA component. The PSC is configured to receive a randomly polarized source light at an input, convert a first portion of the source light into a first output light provided at a first output, and convert a second portion of the source light into a second output light provided at a second output. The first output light and the second output light have a same polarization. The PSC may be a polarization rotation splitter (PRS) or a 2D grating coupler (GC). The first OPA component is directly or indirectly coupled to at least the first output. The second OPA component is directly or indirectly coupled to at least the second output. The apparatus further includes an interference mitigator, which may in some cases be considered as comprising the PSC. The interference mitigator is configured to mitigate uncontrolled optical interference between output of the first OPA component and output of the second OPA component. It is noted that controlled optical interference may still be provided for example to facilitate two OPA components operating together to form a single beam.

In some embodiments, different OPA components are operated as separate OPAs. This may be the case when the two OPA components emit orthogonally polarized light. In other embodiments, the two OPA components are two parts (e.g. halves) of a single OPA. The two OPA components may then cooperate to form a single beam, for example. In other embodiments, where there is only one OPA component, this single OPA component is operated on its own as an OPA.

In some embodiments, the first output light is provided to the first OPA component and the second output light is provided to the second OPA component, and the interference mitigator comprises one or more components of the apparatus configured to cause the first and second OPA components to emit orthogonally polarized light. The interference mitigator may include a half wave plate (HWP) disposed overtop of antenna elements of the second OPA component. It should be understood that overtop refers to placement of the wave plate in the beam from the OPA component, and between the OPA component and the outside scene that is illuminated by the OPA component, although the physical placement of the wave plate may be on the topside, backside or edge of the PIC, depending on whether the OPA component emits light through respectively its topside, backside or edge.

In some embodiments, the interference mitigator comprises a controller operably coupled to the first output and the second output of the PSC. The controller is configured to provide a first controlled output light and a second controlled output light derived from the first output light and the second output light. The first and second controlled output lights have one or both of: controlled relative power levels and controlled relative phase, and the first and second controlled output lights are provided to the first and second OPA components, respectively.

In accordance with embodiments of the present invention, a method is provided for operating an optical phased array. The method includes receiving a randomly polarized source light at a polarization splitting coupler (PSC). The method further includes converting, using the PSC, a first portion of the source light into a first output light, and a second portion of the source light into a second output light, the first output light and the second output light having a same polarization. The method further includes providing the first output light to a first OPA component. The method further includes providing the second output light to a second OPA component adjacent to the first OPA component. The method further includes adjusting polarization of light emitted by one or both of the first and second OPA components so that light emitted by the first OPA component is orthogonal to light emitted by the second OPA component. Herein, adjacent means that OPA components are much closer to each other than the distance to an object in the far field of the OPA, although they are not necessarily touching or abutting.

In accordance with embodiments of the present invention, a method is provided for operating an optical phased array. The method includes receiving a randomly polarized source light at a polarization splitting coupler (PSC). The method further includes converting, using the PSC, a first portion of the source light into a first output light, and a second portion of the source light into a second output light, the first output light and the second output light having a same polarization. The method further includes providing, using a controller, a first controlled output light and a second controlled output light derived from the first output light and the second output light, the first and second controlled output lights having one or both of: controlled relative power levels and controlled relative phase. The method further includes providing the first controlled output light to a first OPA component. The method further includes providing the second controlled output light to a second OPA component adjacent to the first OPA component.

In accordance with embodiments of the present invention, an optical phased array apparatus is provided. The apparatus includes a PSC (e.g. a PRS or 2D GC), a controller, and an OPA component. The polarization splitting coupler (PSC) is configured to receive a randomly polarized source light at an input, convert a first portion of the source light into a first output light provided at a first output, and convert a second portion of the source light into a second output light provided at a second output, the first output light and the second output light having a same polarization. The controller is operably coupled to the first output and the second output of the PSC and is configured to provide a controlled output light by combining the first output light and the second output light. The OPA component is configured to receive the controlled output light from the controller.

In accordance with embodiments of the present invention, a method is provided for operating an optical phased array. The method includes receiving a randomly polarized source light at a polarization splitting coupler (PSC). The method further includes converting, using the PSC, a first portion of the source light into a first output light, and a second portion of the source light into a second output light, the first output light and the second output light having a same polarization. The method further includes providing, using a controller, a controlled output light derived from a combination of the first output light and the second output light. The method further includes providing the controlled output light to an OPA component.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
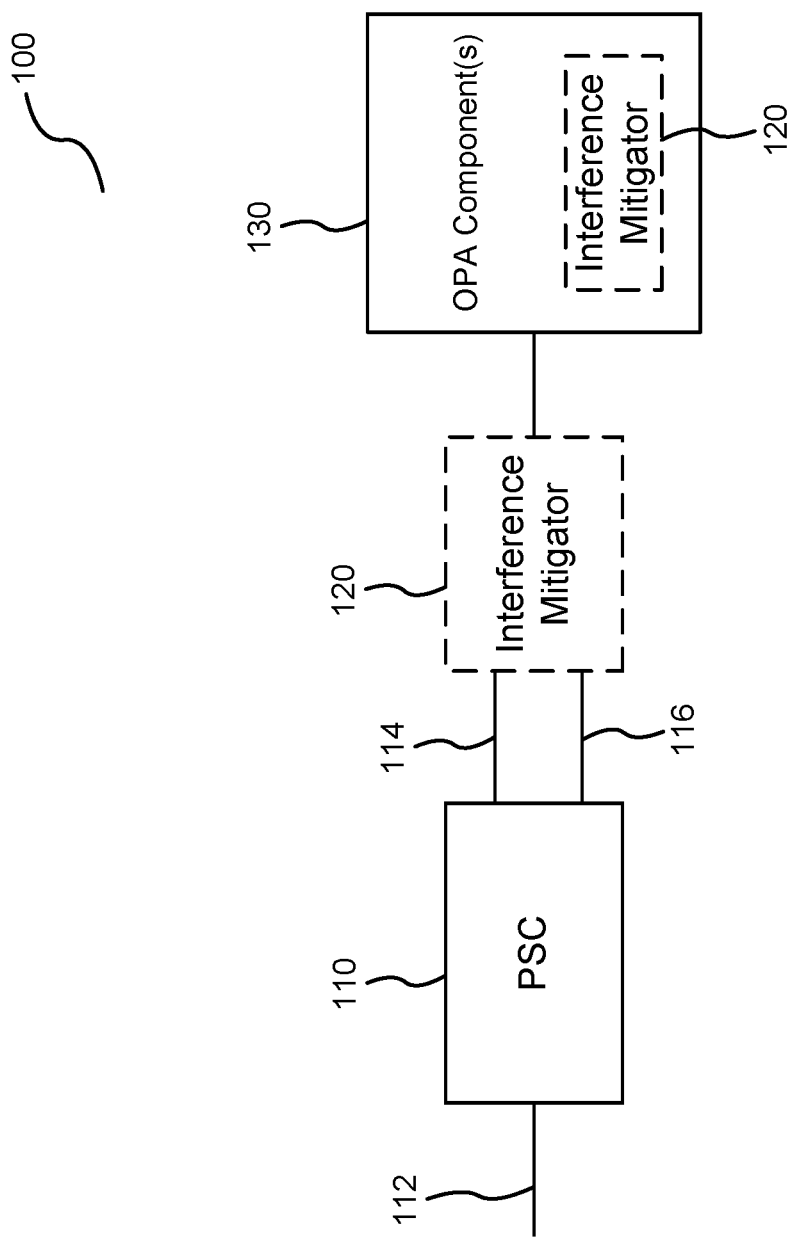
FIG. 1A illustrates a generalized OPA provided in accordance with an embodiment of the present invention.

Embodiments of the present invention provide for an OPA which is configured, through the provision of additional components, to tolerate a variety of polarizations of input light. That is, the OPA configured to operate in a relatively consistent manner regardless of state of polarization of input light. The input light is used as a light source for the antenna elements of the OPA. The additional components can be integrated into the same photonic integrated circuit (PIC) platform (e.g. SOI chip or other Silicon Photonics device) as elements of the OPA. For example, phase shifters can be integrated with optical antennas on a same PIC.

Embodiments of the present invention can comprise a PIC platform realized using materials such as but not necessarily limited to silicon on insulator, silicon nitride, silicon oxynitride, and III-V materials, including GaAs-based and InP-based materials.

Generally, embodiments of the present invention include a Polarization Splitting Coupler (PSC) which has a single input for receiving the input light. The input light may have arbitrary state of polarization, and can be decomposed into two orthogonally polarized components, wherein the relative amplitude and phase of the two orthogonally polarized components depends on the state of polarization of the input light. More specifically, the input light can be viewed as being composed of a combination of a first component having a first polarization, and a second component having a second polarization that is orthogonal to the first polarization. The first component or the second component can constitute all or substantially all of the input light. The PSC includes a first portion leading to a first waveguide output and a second portion leading to a second waveguide output. The PSC is configured to route the first component of the input light toward the first portion and first output, and to route the second component of the input light toward the second portion and second output. The PSC can thus split the input optical beam into the first and second light components corresponding to the first and second orthogonal polarization components, respectively, of the input optical beam. The PSC may operate such that light at the first output and light at the second output are co-polarized, i.e. have the same pre-defined state of polarization of the light in their respective waveguide outputs. As such, subsequent components such as waveguides can be designed for the same polarization, which simplifies the design and manufacture of the PIC.

As such, the PSC separates arbitrarily polarized input light (e.g. decomposing the input light into orthogonal x- and y-polarized components) into two components with the same state of polarization (e.g. two TE-polarized components) within the optical components of a PIC chip. This facilitates polarization transparency or polarization independence for the OPA. In other words, OPA components downstream of the PSC are fed with a consistent polarization of light, which is typically the polarization with which these components are designed to work. One or multiple OPA components are thus excited with the appropriate polarization of light. This can mitigate or eliminate the need for off-chip polarization control between the light source and the OPA and/or use of polarization maintaining fiber for feeding the OPA.

Therefore, substantially all light, or at least a major portion of light, output by the PSC is of a single and consistent polarization, while the state of polarization of input light to the PSC may be different with the state of polarization of PSC output light. This polarization may be one for which a range of optical components, of standard PIC implementations, are adapted to operate. For example, when the apparatus is provided on a silicon photonics chip, the polarization may be a Transverse Electric (TE) polarization. When referring to propagation of light through optical fiber, on-chip waveguides, or other PIC components, the term "polarization" or "state of polarization" will be understood herein to include transverse electric (TE) and transverse magnetic (TM) states of polarization. The TE and TM states of polarization can refer to polarizations of light relative to the waveguides or other apparatus which the light is travelling through, as would be readily understood by a person skilled in the art. The TE and TM states of polarization can also be understood with respect to their corresponding propagation modes, such as the fundamental TE mode (TE0) and the fundamental TM mode (TM0). The polarization of light in a PIC is not defined in terms of the direction of the waveguide in the PIC and thus, unless there is a polarization rotator, the polarization of the light in a waveguide is preserved as the light is routed around the PIC.

In various embodiments, due to the presence of the PSC, polarization maintaining fiber or off-chip polarization control is not required. Polarization management elements can be realized on chip in order to realize a polarization insensitive OPA.

In some embodiments, the PSC is a Polarization Rotation Splitter (PRS). The PRS is configured to separate TE-polarized input light from TM-polarized input light, direct the TE-polarized light into a first waveguide, direct the TM-polarized light into a second waveguide, and convert (rotate) the TM-polarized light in the second waveguide into TE-polarized light. The conversion may be performed based on either a mode coupling or a mode evolution process. Examples of suitable PRSs are described in Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014).

In some embodiments, the PSC is a Two-Dimensional Grating Coupler (2D GC). The 2D GC is a polarization-diversity coupler configured to couple the unknown state(s) of polarization of an optical fiber into two TE-polarized light outputs via integrated waveguides. A suitable example 2D GC is described in G. Roelkens, D. Vermeulen, S. Selvaraja, R Halir, W. Bogaerts, and D. Van Thourhout, "Grating-Based Optical Fiber Interfaces for Silicon-on-Insulator Photonic Integrated Circuits," IEEE Journal of Selected Topics in Quantum Electronics, Vol. 17, No. 3, May/June 2011.

In some embodiments, the PSC may be a PRS or a 2D GC configured to couple the unknown state(s) of polarization of an optical fiber into two TM-polarized light outputs. The portion of the PIC following the PSC, e.g. including the OPA components, can be configured for operation using TM-polarized light, for example by providing an antenna comprising a surface grating coupler whose pitch is optimized to couple light propagating in the PIC with the effective index of TM-polarized light.

As noted above, the PSC outputs two separate but co-polarized light components obtained from randomly or arbitrarily polarized input light. The PSC routes input light to its two different outputs based on a characteristic of the light such as polarization. Because the state of polarization of input light can be arbitrary and time-varying, when the input light is decomposed to two orthogonal components, the optical power of the two components can potentially vary substantially. For example, when the polarization of input light is time-varying, the output power of the PSC can swing between its two outputs.

As will readily be understood by a person skilled in the art, interference of light can occur if two light signals are coherent, meaning that they have a constant phase difference, and if the signals are monochromatic, meaning that they are substantially of a single wavelength. The second condition is satisfied for light sources typically used in the present invention, such as fiber laser. The two outputs of a PRS or 2D GC have a fixed phase difference at a given time, even if the phase difference varies over time. Therefore undesired interference is possible and indeed such interference may vary over time.

Figure 3:
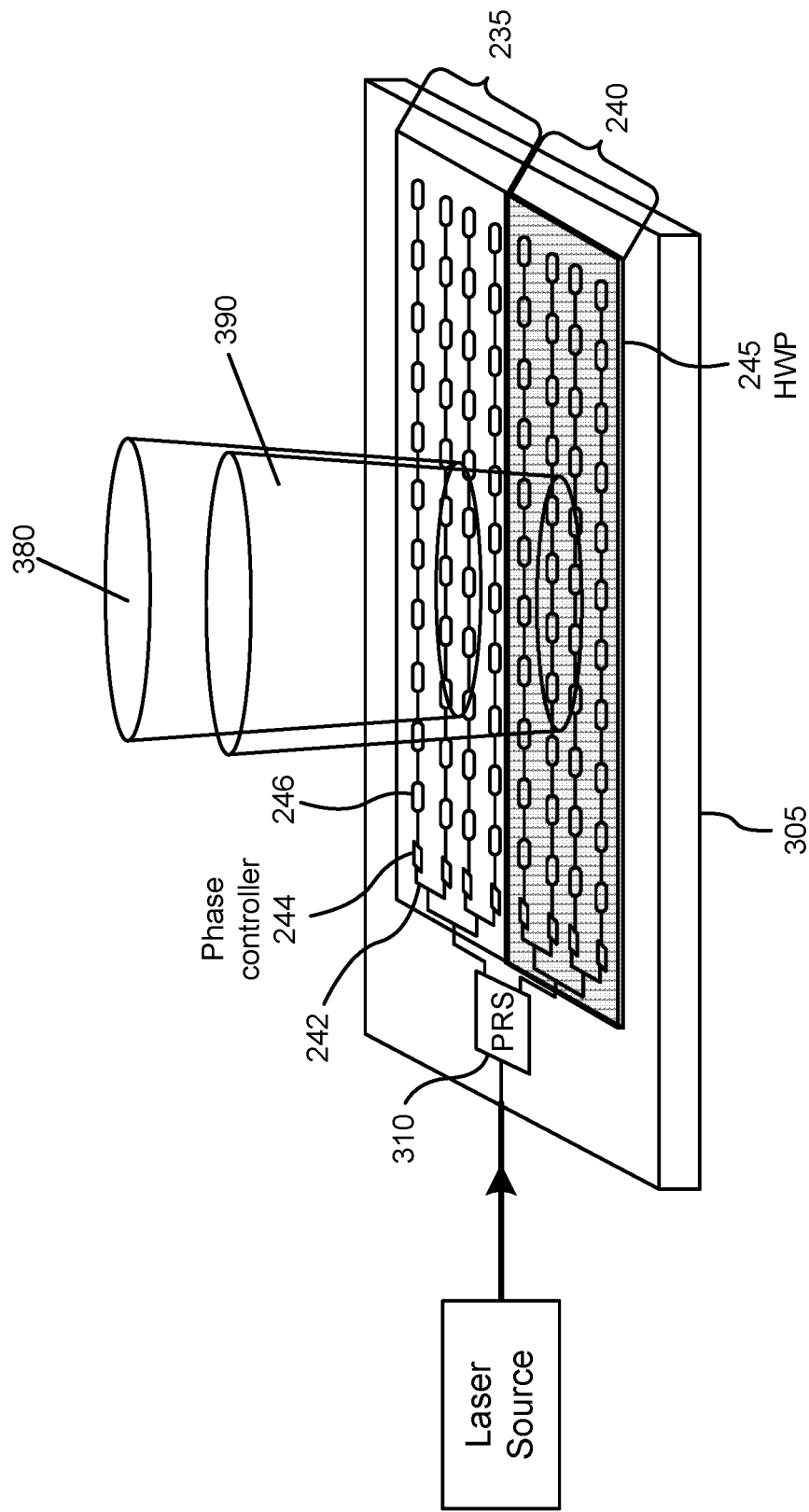
FIG. 3 illustrates an OPA including a polarization rotation splitter and a half wave plate, in accordance with another embodiment of the present invention.
Figure 4:
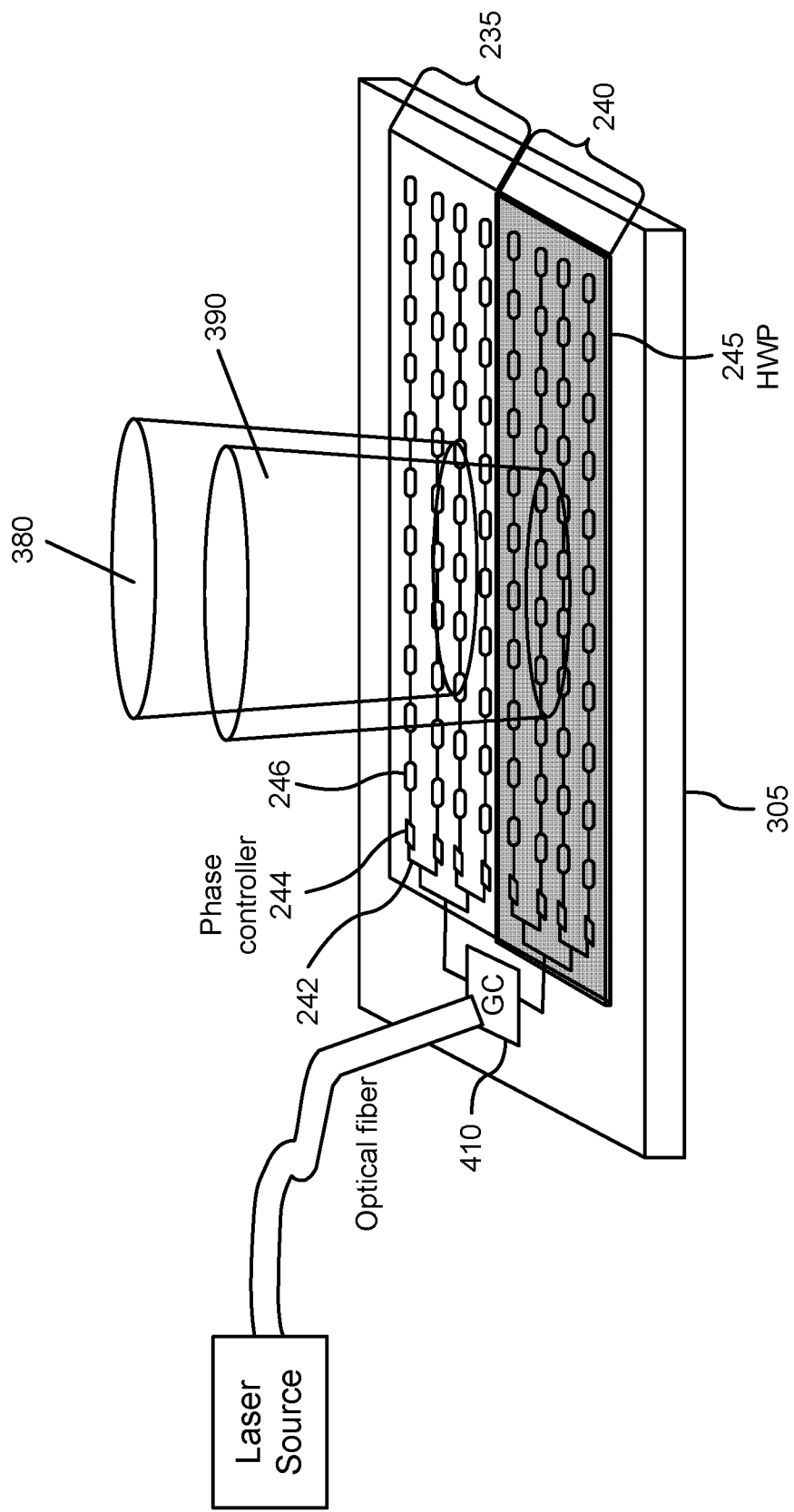
FIG. 4 illustrates an OPA including a two-dimensional grating coupler and a half wave plate, in accordance with another embodiment of the present invention.
Figure 11A:
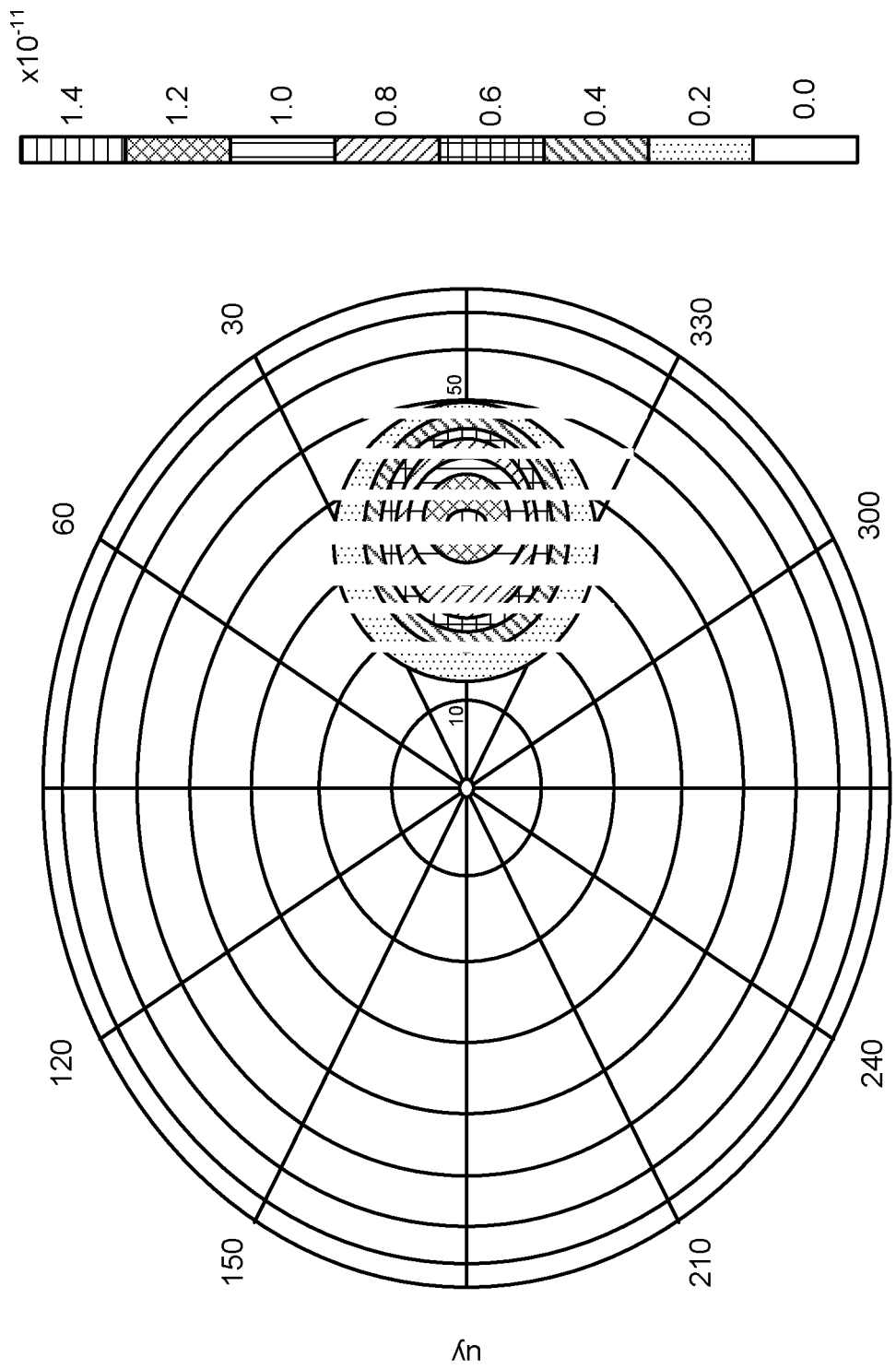
FIG. 11A illustrates a simulated far-field radiation pattern due to operation of two adjacent OPA components without interference mitigation.
Figure 11B:
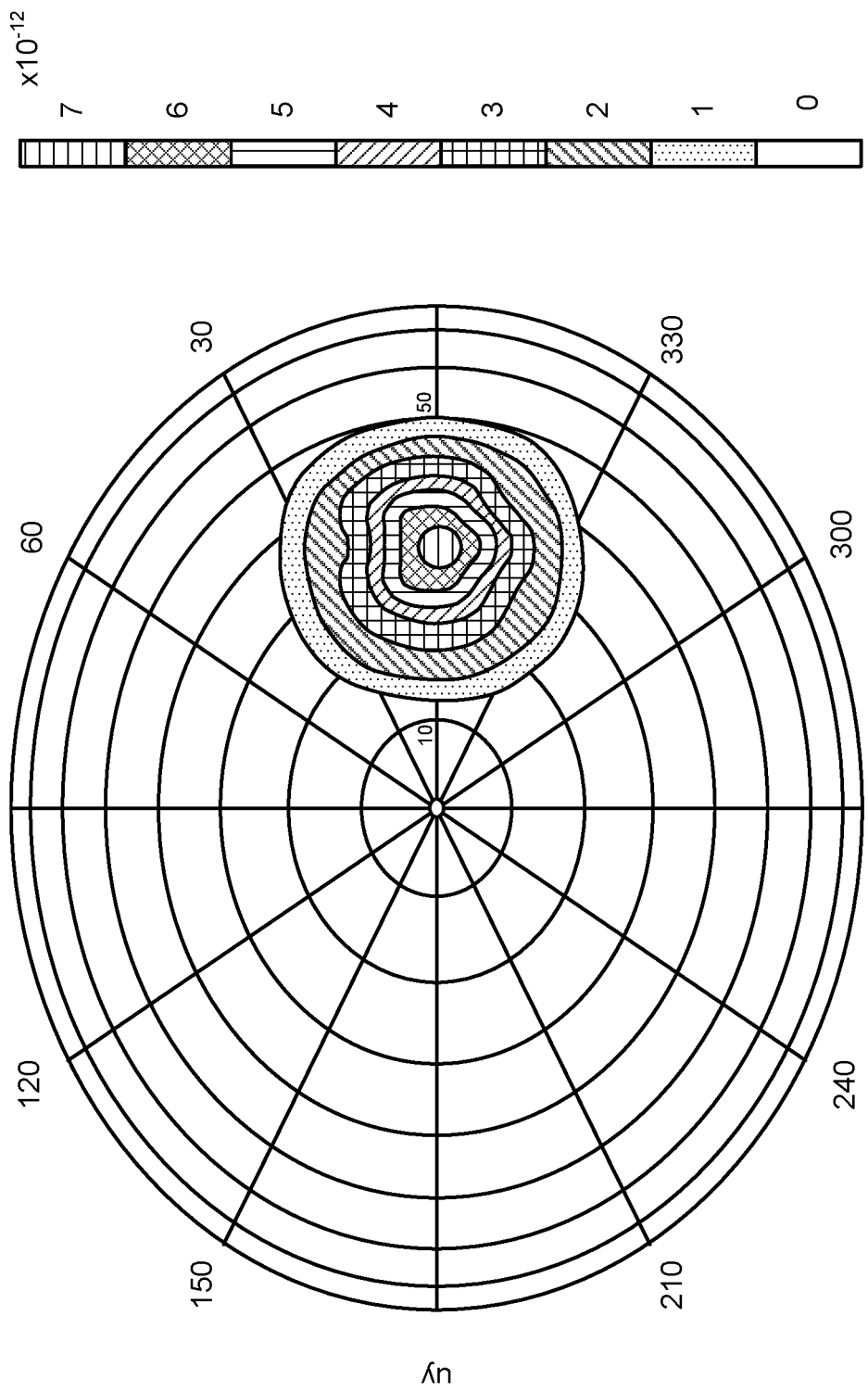
FIG. 11B illustrates a simulated far-field radiation pattern due to operation of two adjacent OPA components with interference mitigation, in accordance with an embodiment of the present invention.

A motivating example for interference mitigation is described with respect to FIGS. 11A and 11B. FIGS. 11A and 11B exhibit far-field radiation patterns due to concurrent operation of two adjacent OPA components (e.g. as shown in FIGS. 3 and 4), without and with interference mitigation, respectively. Without mitigation, an interference pattern may occur due to the interference between the two co-polarized OPA components. Similarly, due to the lack of a controller, the phase difference between the two OPA components is not fixed due to the variable input light. In some embodiments, a HWP or similar structure is used to cause the polarizations of the two OPA components to differ, thus avoiding light interference there-between. Without such measures, the beams created by the two OPA components may interfere, creating an undesirable set of interference fringes in the far field (FIG. 11A). This would reduce the far-field resolution of the OPA, and would reduce the far-field resolution of the apparatus. Embodiments of the present invention therefore mitigate uncontrolled OPA interference and can reduce or eliminate the resulting interference fringes.

To address this issue, embodiments of the present invention provide one or more forms of interference mitigation. For clarity, this refers to mitigation of undesired interference, rather than desired interference phenomena upon which operation of the OPA may rely for steering beams. Two beams of light that have orthogonal polarizations do not interfere. In some embodiments, the interference mitigation comprises a half wave plate (HWP) or other structure to orthogonalize the polarization of output light from different OPA components. In some embodiments, the interference mitigation comprises a polarization controller (PC) (PSC is an element of PC) located in front of the OPA components (i.e. between the light input and the OPA components). In some embodiments, the PC operates to mitigate the uncontrolled relative power and phase between the different outputs of the PSC, thereby adjusting the power ratio and phase difference between the two PSC outputs. For example, the PC may have two outputs and operate to control the relative optical power and relative optical phase in the outputs of the PC, said outputs thereby delivering light to the component OPAs with a controlled relative optical power and controlled relative optical phase. In some embodiments, the interference mitigation comprises a single-output polarization controller which combines light components output by the PSC into a single controlled output which is passed to a single OPA component.

It is noted that the controller is implemented on-chip, i.e. on the same PIC substrate as the OPA components, thus reducing cost and complexity relative to off-chip solutions. Similarly, the HWP or other structure can be implemented on-chip, directly attached to the chip, or co-packaged with the chip. The interference mitigator is therefore a portion of the OPA which is configured to mitigate or eliminate possible interference in the OPA due to the two outputs of the PSC being potentially unbalanced, out of phase, and uncontrolled.

In more detail, in some embodiments, the two outputs of the PSC are coupled to two separate OPA components (of the overall OPA). This may be a direct coupling, with the intermediate controller being omitted. The OPA components may be disposed on a common plane, for example. Furthermore, the state of polarization of the light emitted from the two OPA components are orthogonalized, such that one OPA component transmits light that is orthogonal to light transmitted by the other OPA component. In one embodiment, to achieve orthogonalization, the two OPA components may be substantially identical, except for a Half Wave Plate (HWP) disposed overtop of one of the OPA components. A wave plate is a well-known optical device that modifies the polarization of light that passes through the wave plate, in general performing an elliptical transformation of the state of polarization. A half wave plate is a particular form of wave plate that can be oriented to rotate the polarization by 90 degrees. That is, the HWP is configured to change, by 90 degrees, the polarity of light passing from this OPA component, thereby rendering the light out of the HWP orthogonally polarized to the light input to the HWP.

In another embodiment, there are two wave plates, wherein one wave plate is disposed overtop of each OPA component. The two wave plates cooperate to generate the orthogonalization. The two wave plates implement transforms that sum to a half wave transform. For example, these wave plates may be two quarter wave plates of opposite sign.

In other embodiments, rather than using waveplates, the antennas of a first OPA component are oriented with respect to the layout of the PIC so that they are orthogonal to the antennas of a second OPA component. Hence the light emitted by the first OPA component is orthogonally polarized with respect to the light emitted by the second OPA component. As such, the antenna orientation is used to facilitate the interference mitigation. This approach may be combined with other approaches, such as the use of half wave plates.

In more detail, in some embodiments, an optical controller is coupled to the two outputs of the PSC. The controller may include a feedback control circuit. The combination of the PSC and the controller coupled to the outputs of the PSC is also referred to herein as a polarization controller (PC). The polarization controller is used to couple light from the input port for providing a pre-defined state of polarization of output light derived from the optical beam. In various embodiments, the polarization controller acts as a Mach-Zehnder interferometer (MZI) or coupled Mach-Zehnder interferometers and includes a PSC (such as a PRS or 2D GC), one or more phase shifters, and one or more 2×2 optical couplers. The optical coupler may be a 3 dB optical coupler, for example. As mentioned above, the PSC provides separated first and second (light) components at its first and second outputs. The phase shifter provides optical phase adjustment between the separated first and second light components. The 2×2 coupler mixes the first and second light components, following the phase shift, and outputs third and fourth light components. The PC may comprise a first stage MZI, and may further include additional MZI stages coupled to the first stage MZI. The phase difference and the ratio of the two output powers of the PSC can be controlled by the PC, based on OPA requirements. Further details on a potentially suitable PC can be found for example in "Active Polarization Independent Coupling to Silicon Photonics Circuit," by J. Niklas Caspers et al., Proc. SPIE 9133, Silicon Photonics and Photonic Integrated Circuits IV, 91330G (1 May 2014).

The PC can include one or multiple MZI stages, each including phase shifters and couplers. The PC can adjust the phase difference between two arms of one or more of the MZI stages. The PC further operates to provide two controlled output lights having a desired phase and/or optical power. For example, the two controlled output lights can be made to have the same phase, the same optical power, or both. As another example, one controlled output light can be made to have more optical power than the other. In particular, one controlled output light can be made to have substantially all of, or at least a major portion of, the optical power.

In more detail, in some embodiments, an optical controller having a single output is coupled to the two outputs of the PSC. This is provided as one form of polarization controller. The single-output controller is configured to route the first and second light components to this single output. The single-output controller may include a feedback control circuit. The single-output controller can be viewed as a form of controller with only one optical output, and which routes substantially all input light to this output. Such routing can be performed using feedback control. The output is connected to a single OPA component.

FIG. 1A illustrates a generalized OPA 100 provided according to various embodiments of the present invention. The OPA 100 comprises a PSC 110 having two outputs, one or more OPA components 130, and an interference mitigator 120 which is either coupled between the PSC 110 and the OPA components 130, or which is integrated with or coupled to an output of at least one of the OPA components 130. It is noted that the PSC 110 and interference mitigator 120 cooperate to perform the interference mitigation. That is, the PSC can be considered part of the interference mitigator.

The PSC 110 is configured to receive a source light at an input 112, such as an input coupled to an optical fiber carrying a laser output light. The PSC converts a first portion of the source light into a first output light provided at a first output 114 and convert a second portion of the source light into a second output light provided at a second output 116. The first output light and the second output light have a same polarization, such as a TE polarization.

Figure 1B:
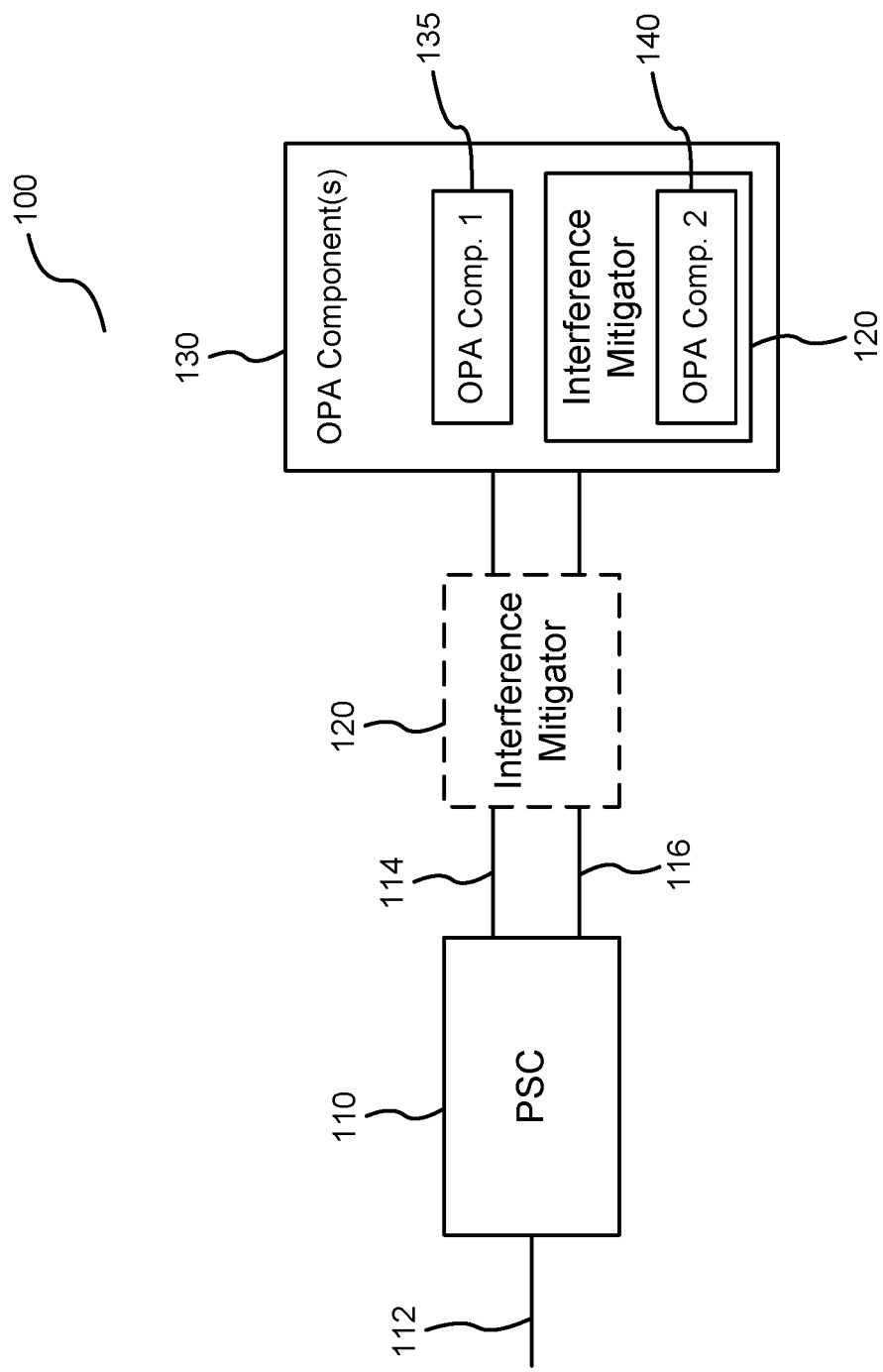
FIG. 1B illustrates an OPA including two OPA components and an interference mitigator associated at least with one of the OPA components, in accordance with another embodiment of the present invention.
Figure 1C:
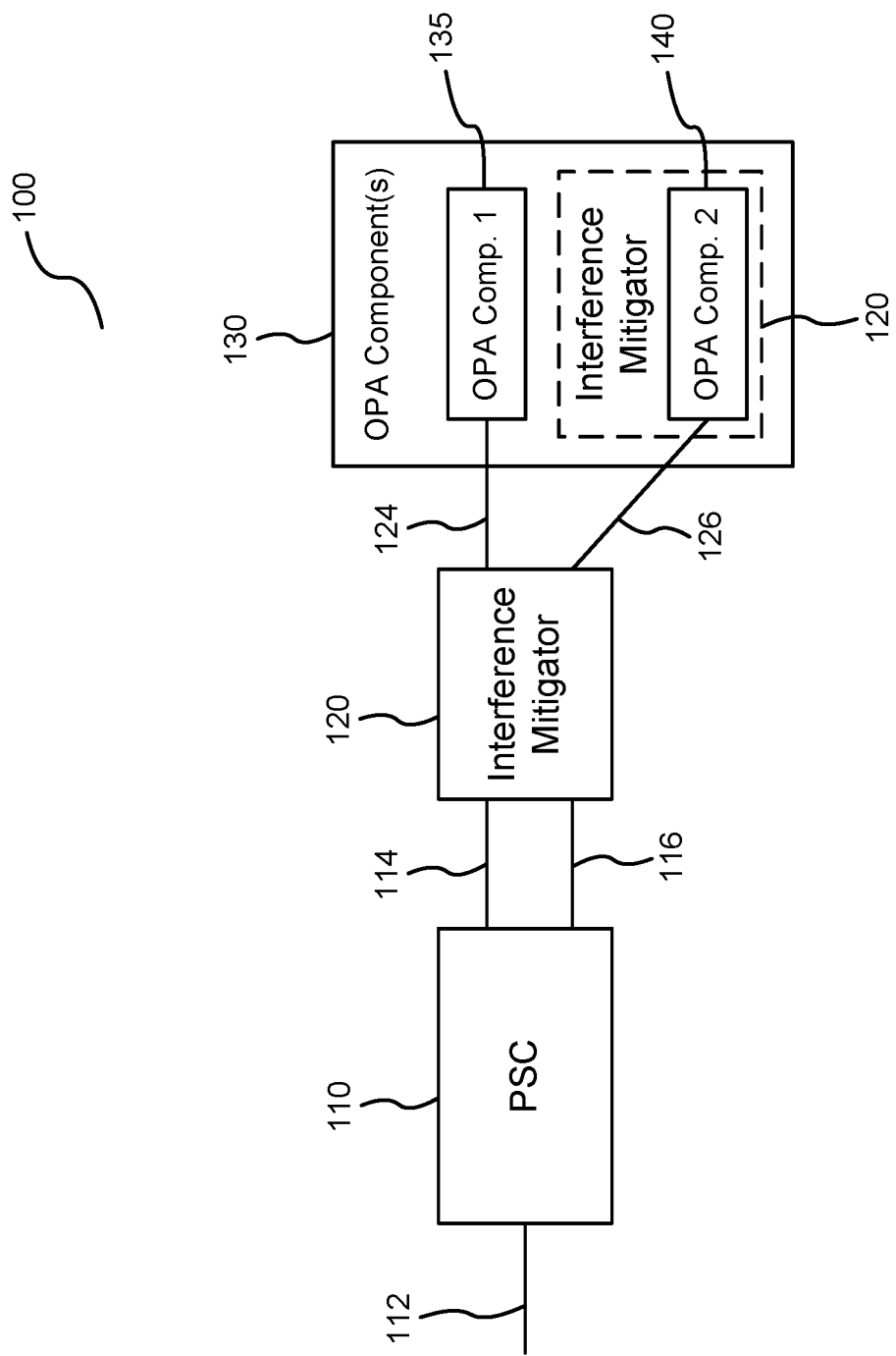
FIG. 1C illustrates an OPA including two cooperating OPA components and an interference mitigator for regulating light output by a PSC, in accordance with another embodiment of the present invention.

Depending on the location of the interference mitigator 120, the OPA components 130 are directly or indirectly coupled to the outputs of the PSC 110. Accordingly, the OPA components 130 directly or indirectly receive the first and second output lights. In some embodiments, as illustrated more explicitly in FIGS. 1B and 1C, two OPA components 135, 140 are provided. In FIG. 1B the two OPA components may be two separate OPAs. In FIG. 1C, the two OPA components may be two cooperating halves of a single OPA. That is, they may operate together as a single overall OPA component. The interference mitigator is configured to mitigate uncontrolled optical interference between outputs of the two OPA components 135, 140. In some further embodiments, as illustrated in FIG. 1B, the interference mitigator is integrated with or coupled directly to one of the two OPA components, e.g. OPA 140. In some further embodiments, as illustrated in FIG. 1C, the interference mitigator is coupled to the first and second outputs 114, 116 of the PSC 110 and generates two controlled output lights 124, 126. Each of the two controlled output lights is provided to one of the two OPA components 135, 140.

Figure 1D:
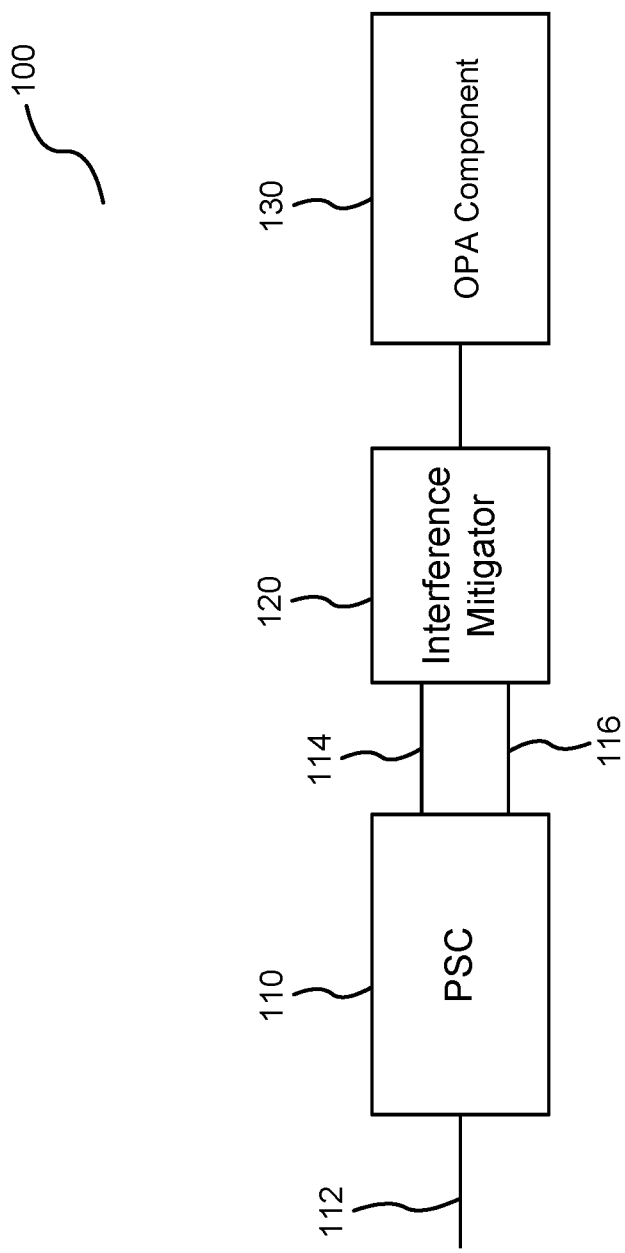
FIG. 1D illustrates an OPA including a single OPA component, in accordance with another embodiment of the present invention.

FIG. 1D illustrates another configuration, in which the interference mitigator 120 outputs a single light to a single OPA component 130. The interference mitigator can combine the light from the two outputs 114, 116 of the PSC 110 into a single output. The interference mitigation in this embodiment is achieved by combining the input light a single output without changing the state of polarization, passed to a single OPA component. Because only one OPA component is used, the potential for interference between the output beam(s) of each of multiple (e.g. two) OPAs is avoided.

FIGS. 2 to 10 illustrate various embodiments which correspond generally to FIGS. 1A to 1D. In each of these figures, similar components have similar features.

Figure 2:
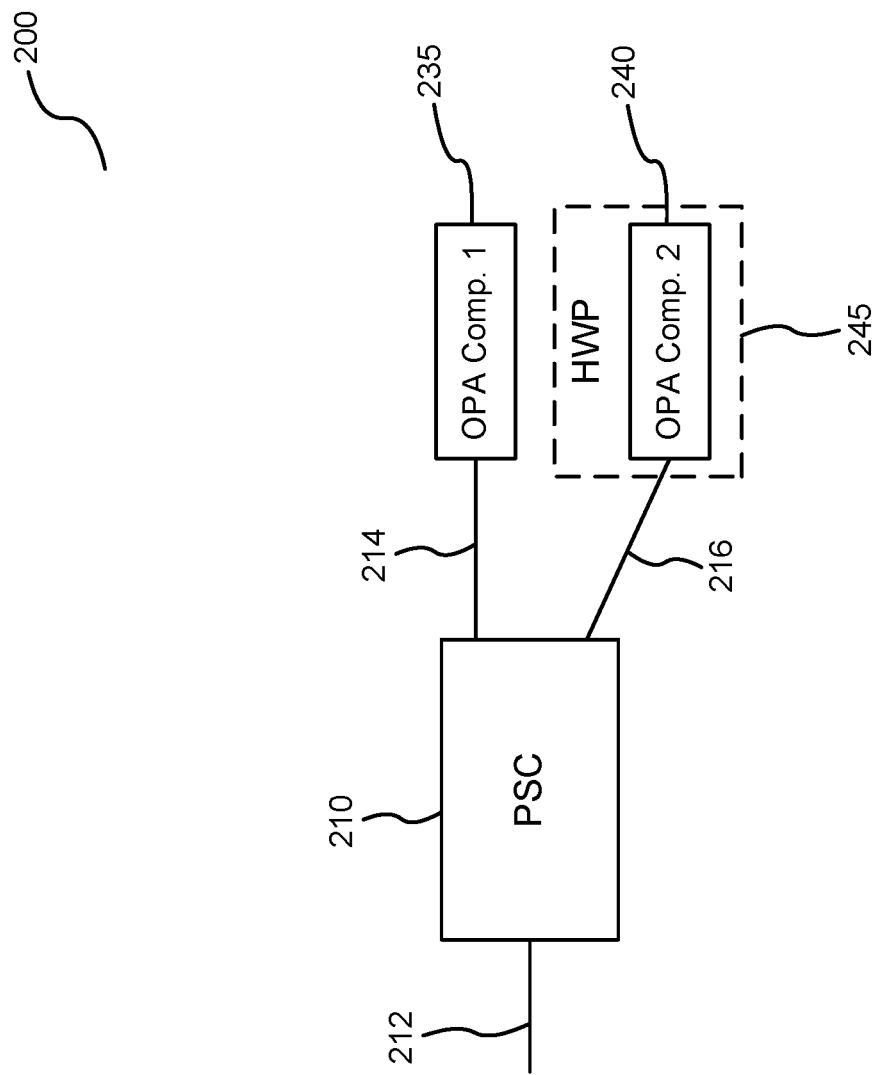
FIG. 2 illustrates an OPA including two OPA components and a half wave plate, in accordance with an embodiment of the present invention.

FIG. 2 illustrates an OPA 200 provided in accordance with embodiments of the present invention. Such embodiments also relate to those shown in FIG. 1B. The PSC 210 is directly coupled to two OPA components 235, 240, with the first output 214 of the PSC 210 coupled to the first OPA component 235, and the second output 216 of the PSC 210 coupled to the second OPA component 240. The PSC 210 receives randomly polarized input light at input 212. The two OPA components are orthogonalized via operation of the interference mitigator, which in the present embodiment takes the form of a half wave plate (HWP) 245 disposed overtop of antenna elements of the second OPA component 240. The HWP 245 is configured to rotate polarization of light emitted by the antenna elements by 90 degrees, thereby causing the first and second OPAs to emit orthogonally polarized light.

FIG. 3 illustrates an OPA according to the embodiment illustrated in FIG. 2, but in particular wherein the PSC is provided as a polarization rotation splitter (PRS) 310. As illustrated, all components of the OPA are located on the same PIC substrate 305, for example as an integrated chip. As also illustrated, each of the OPA components 235, 240 comprises plural branches (e.g. branch 242) each comprising a phase controller 244 (e.g. controllable phase shifter) coupled to multiple antenna elements (e.g. element 246). By adjustments of the phase controllers 244, the beam(s) 380 from the OPA component 235 and (separately) the beam(s) 390 from the OPA component 240 may be steered in an angular fashion in-and-out of the plane of the drawing of FIG. 3. Output of the PRS 310 is provided to each of the phase controllers via a waveguide, and output of the phase controllers is provided to the antenna elements via a further waveguide.

While 380 and 390 are each drawn as a single beam for clarity, 380 and 390 may each comprise multiple sub-beams. (An example of how one OPA may create multiple sub-beams is shown in Komljenovic, and in particular FIG. 2d of said reference.) In general, the direction, number of sub-beams, size and normalized intensity profile of beam(s) 380 are at any given moment identical to those of beam(s) 390, such that both OPA components 235, 240 are at any given moment illuminating the same region of the outside scene. The beam(s) 380 have orthogonal polarizations with respect to the beam(s) 390, and thus the beam(s) 380 do not interfere with the beam(s) 390. However, as the relative optical power in the two outputs of the PRS 310 is not controlled in this embodiment, the beam(s) 380, 390 do not in general have the same optical power. Nonetheless, as the beam(s) 380, 390 are essentially non-interacting, the optical power delivered to a target in a scene is simply proportional to the linear sum of the optical power in the beam(s) 380 and 390, and thus the absence of relative optical power control is not detrimental to the operation of this embodiment.

The beam(s) 380 and (separately) 390 are each a complete well-formed beam, with an intensity profile such as to propagate toward the outside scene with a desired beam cross-section. In particular, the beam(s) 380 are not intended to interact with the beam(s) 390 to jointly form a larger beam. As such, the beam(s) 380 may be configured to be separate and distinct from the beam(s) 390, for example due to polarization orthogonality.

It should be noted that this configuration of OPA components is provided as an example. Different configurations of OPA components can be substituted, as would be readily understood by a person skilled in the art. Each antenna element can emit light into the environment using a diffractive effect such as by means of a surface grating coupler, or using a reflective surface such as a mirror facet etched into the chip. The beam(s) 380, 390 may be steered by changing the wavelength of the laser source, or by introducing and operating additional phase controllers interspersed with the antenna elements 246.

FIG. 4 illustrates an OPA according to the embodiment illustrated in FIG. 2, but in particular where the PSC is provided as a two dimensional grating coupler 410. Similarly to FIG. 3, all components of the OPA are located on the same PIC substrate 305, and each of the OPA components comprises, by way of example, plural branches each comprising a phase controller coupled to multiple antenna elements.

In FIGS. 3 and 4, the HWP 245 is placed directly overtop of the second OPA component 240 in order to interact with light emitted thereby. The HWP 245 adjusts the polarization angle of emitted light, so that the two OPA components emit differently (typically orthogonally) polarized lights. It should be understood that the light into the antenna elements 246 in the first OPA component 235 has the same polarization as the light into the antenna elements 246 in the second OPA component 240. Similarly, the light emitted by the antenna elements 246 in the first OPA component 235 has the same polarization as the light emitted by the antenna elements 246 in the second OPA component 240. Therefore, if the HWP 245 were omitted, the beams created by the two OPA components would interfere, creating an undesirable set of interference fringes in the far field, as will be explained further with respect with FIGS. 11A and 11B. This would reduce the far-field resolution of the OPA 305, and would reduce the far-field resolution of the apparatus. Hence, it may be understood that the purpose of the HWP 245 is to ensure that the respective beams from the two OPA components 235, 240 do not interfere (as they are now of orthogonal polarizations), or at least reduce interference. Non-interfering OPA components are expected to result in a lack of interference fringes.

Figure 5:
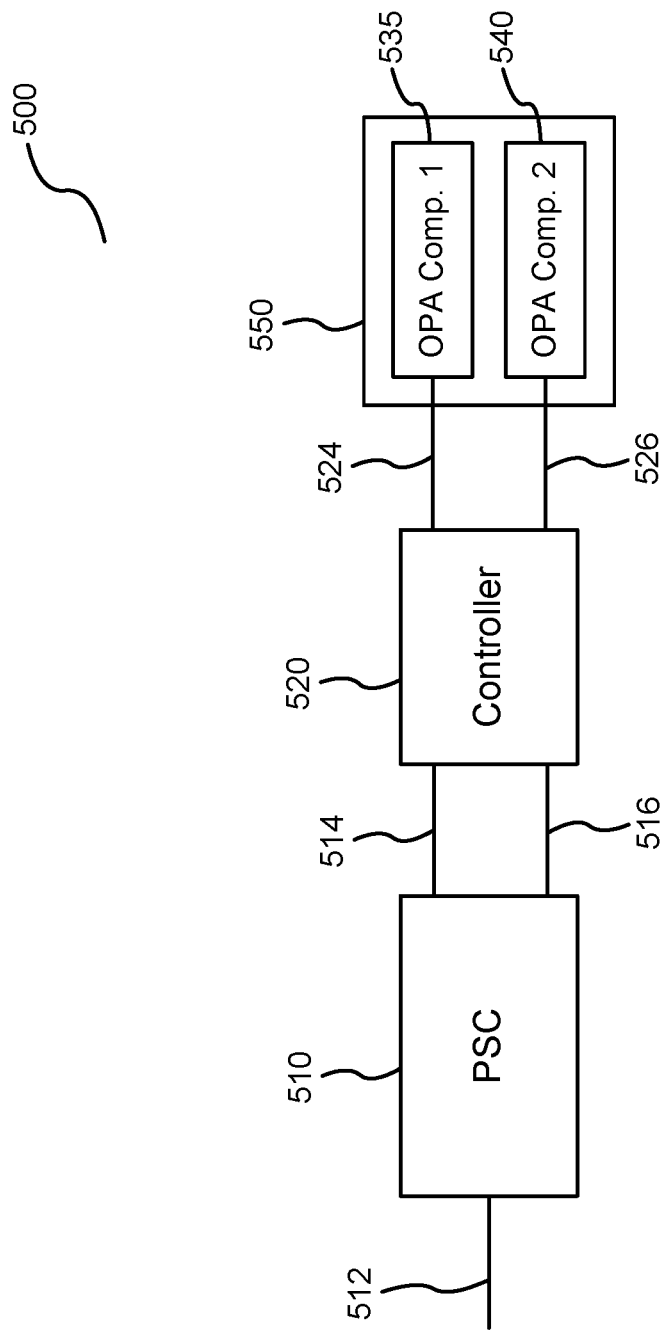
FIG. 5 illustrates an OPA including two OPA components and a controller, in accordance with an embodiment of the present invention.
Figure 6:
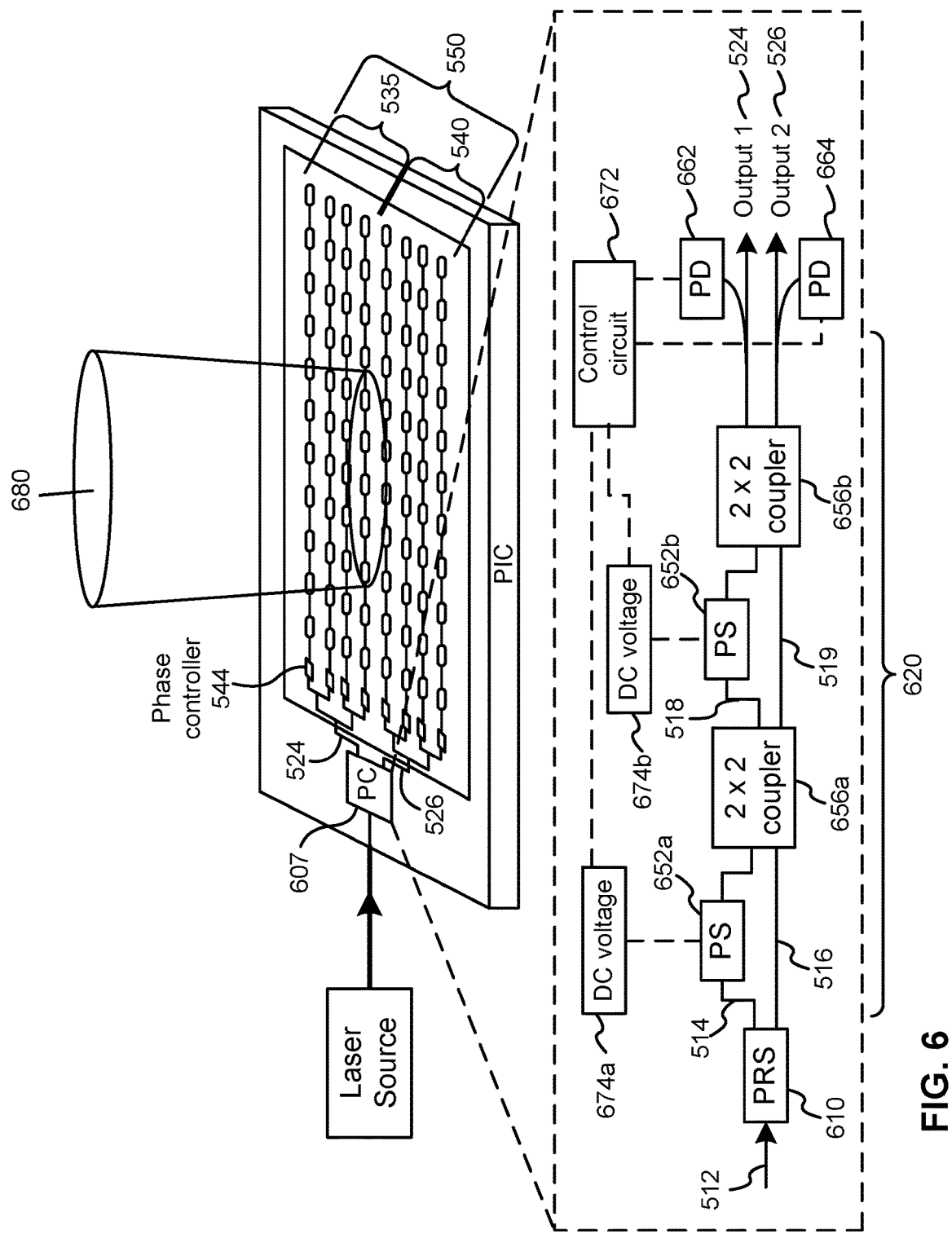
FIG. 6 illustrates an OPA including a polarization rotation splitter, two OPA components and a controller, in accordance with another embodiment of the present invention.

FIG. 5 illustrates an OPA 500 provided in accordance with other embodiments of the present invention. Such embodiments also relate to those shown in FIG. 1C. The interference mitigator in this embodiment comprises a controller 520 operably coupled, for example by means of optical waveguides, to both the first output 514 and the second output 516 of the PSC 510. The PSC 510 can be a PRS or a 2D GC, receiving randomly polarized input light at input 512. The controller 520 is configured to provide a first controlled output light 524 and a second controlled output light 526 derived from the first output light and the second output light. There is a single overall OPA component 550 creating a single beam 680 as shown in FIG. 6. The overall OPA component 550 includes a first OPA component 535 which forms a first half of the overall OPA component 550 and a second OPA component 540 which forms a second half of the overall OPA component 550. The first half 535 and the second half 540 act together to create the beam 680, wherein the beam 680 may comprise sub-beams. The first controlled output light 524 is provided to the first half 535 of the overall OPA component 550, and the second controlled output light 526 is provided to the second half 540 of the overall OPA component 550.

The controller 520 may be configured to provide a desired proportion of input light as the first controlled output light and the remainder of the input light as the second controlled output light. In some embodiments, the desired proportion is about 50%. In some embodiments, the desired proportion is another value.

The overall OPA component 550 contains branches, phase controllers and antenna elements essentially similar to those of FIG. 3. If the relative optical power and relative phase into the branches is not controlled, then the light emitted from the first half 535 of the overall OPA component 550 would interfere in an uncontrolled manner with the light emitted from the second half 540. Thus, the controller 520 mitigates uncontrolled interference by controlling the relative optical power and relative optical phase in the output lights 524, 526, thereby creating a single well-controlled beam 680. In this embodiment, the two OPA components 535, 540 abut each other essentially along their entire length of the region that contains the antennae, that is to say they touch or nearly touch along an edge, with the beam 680 essentially centered on this edge. For example, the beam can comprise two symmetric halves, and a plane which comprises this edge and extends along a main axis of the beam is a plane of symmetry for the beam.

FIG. 6 illustrates an OPA according to the embodiment illustrated in FIG. 5, but in particular where the PSC is a PRS 610, and the controller 620 takes a particular form described as follows. The PRS and the controller are shown as serially connected components of a polarization controller (PC) 607.

The controllers of FIGS. 6, 7, 8A 8B, 9 and 10 include multiple stages. Multiple stages of controller are used to realize the desired output signal with controlled phase and power difference. Examples of suitable multiple stage controller are described in J. Niklas Caspers, Yun Wang, Lukas Chrostowski and Mo Mojahedi "Active polarization independent coupling to silicon photonics", Proc. SPIE 9133, Silicon Photonics and Photonic Integrated Circuits IV, 91330G (1 May 2014) and in Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014) said references also describing the physical principles by which such a controller acts to control polarization. These references therefore illustrate how optical waveguide polarization controllers can be implemented using 2 or more optical stages, each stage comprising at least one optical phase shifters followed by a 2×2 optical coupler, said phase shifters being controlled by means of photodetectors and an electronic control feedback.

The controller 620 includes a first phase shifter section coupled to one or both of the first output 514 and the second output 516 of the PRS 610. The first phase shifter section is configured to adjust relative phase of the first output light and the second output light. In the illustrated embodiment, the first phase shifter section includes a single phase shifter 652a coupled to the first output 514. In other embodiments, the first phase shifter section may further include another phase shifter coupled to the second output 516, in which case the two phase shifters may operate in a complementary manner to produce a relative phase shift.

The controller 620 further includes a first optical coupler 656a coupled to an output of the phase shifter section. The first optical coupler 656a receives and couples the first output light and the second output light provided by the PRS 610 following relative phase control by the phase shifter section. As illustrated, the first optical coupler 656a is directly coupled to the output of the phase shifter 652 and to the second output 516. When another phase shifter is coupled to the second output 516, the first optical coupler 656a may also be directly coupled to the output of this other phase shifter. The first optical coupler 656a outputs first and second outputs, also referred to as intermediate coupler output lights 518, 519, which are routed to a second phase shifter section, similar to the first phase shifter section. In the present embodiment, the first intermediate coupler output light 518 is provided to a second phase shifter 652b and the second intermediate coupler output light 519 is provided directly to a second optical coupler 656b. As with the first phase shifter section, the second intermediate coupler output light 519 may alternatively be routed through another phase shifter operating in a complementary manner with the second phase shifter 652b. The output of the second phase shifter 652b is also provided to the second optical coupler 656b.

The second optical coupler 656b outputs first and second coupler output lights. In the present embodiment, the first and second coupler output lights are provided directly as the first and second controlled output lights 524, 526, respectively. More generally, in embodiments potentially involving multiple control stages, the outputs of the last serially-connected optical coupler are provided as the controlled output lights.

Figure 9:
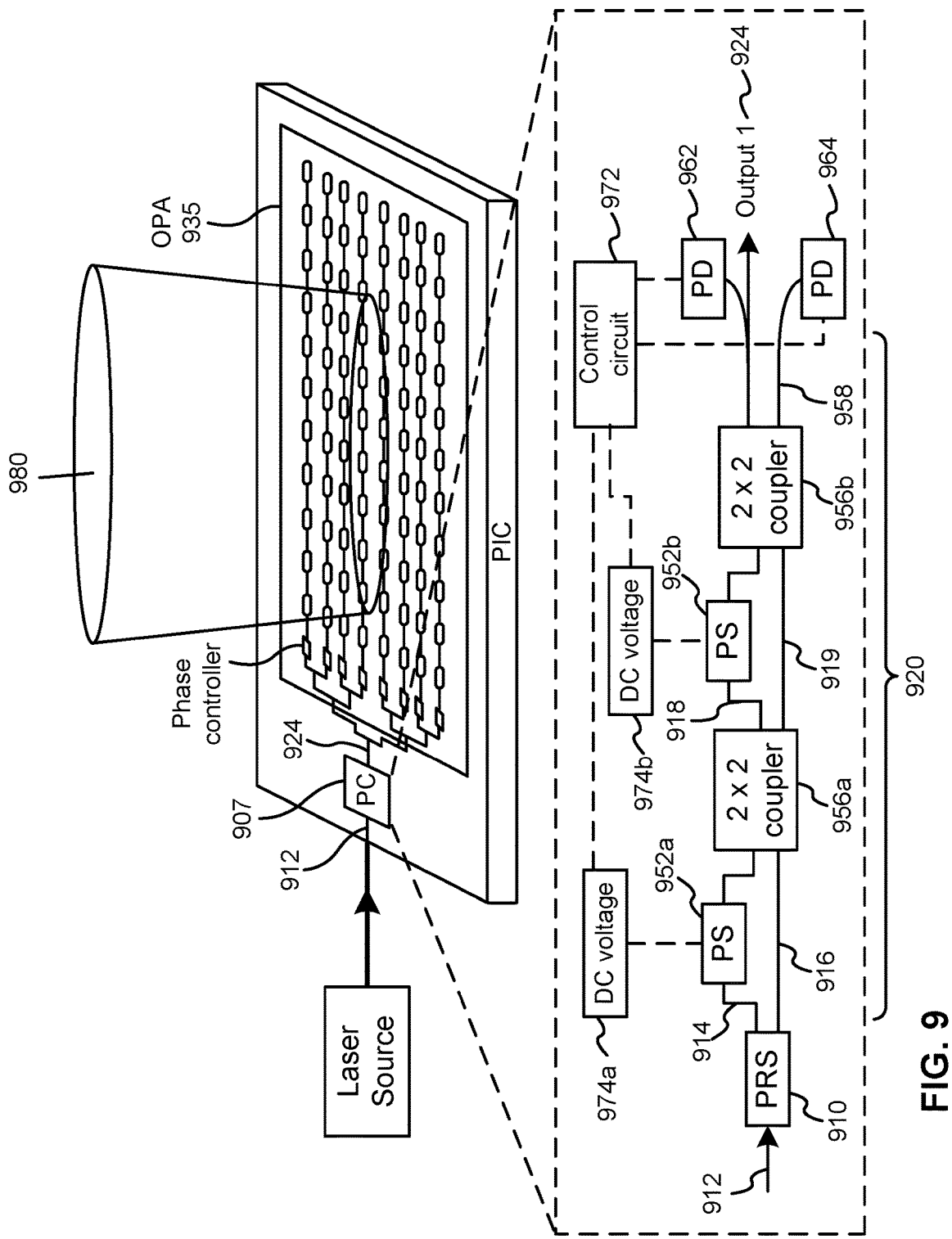
FIG. 9 illustrates an OPA including a polarization rotation splitter, a single OPA component and a controller, in accordance with another embodiment of the present invention.

The controller 620 further includes a feedback control section comprising a pair of photodetectors 662, 664, either of which may be omitted, and a control circuit 672. The photodetectors 662, 664, which may be photodiodes, are configured to monitor power of the first controlled output light 524 and the second controlled output light 526, respectively. The photodetectors may be coupled via optical taps to the optical waveguides providing the output lights 524, 526. Signals from the photodetectors 662, 664, indicative of light detected thereby, are provided to the control circuit 672. More generally, the feedback control section of controller 620, as well as the feedback control sections of other controllers such as but not limited to controller 920 as illustrated in FIG. 9, can comprise one or more photodetectors configured to monitor power of one or both of the first controlled output light and the second controlled output light.

The control circuit 672 is configured to control relative phase adjustment applied by the first and second phase shifter sections, including by phase shifters 652a and 652b, based on output of the pair of photodetectors. The control circuit 672 may be an analog circuit, a digital circuit, or a combination thereof. Part or all of the control circuit 672 may be provided as an integrated circuit component, such as an ASIC or FPGA. The control circuit 672 is part of the overall controller 620. The control circuit 672 provides an output signal that is used for driving the phase shifter section in a predetermined manner, based on the signals from the photodetectors. In various embodiments, a DC voltage 674a, generated by the control circuit 672 or via a separate voltage generator, may be provided to the first phase shifter section for controlling the phase shifter(s) (e.g. phase shifter 652a) thereof. A DC voltage 674b, generated by the control circuit 672 or via a separate voltage generator, may also be provided to the second phase shifter section for controlling the phase shifter(s) (e.g. phase shifter 652b) thereof. Beam(s) 680 emitted by the antenna elements of the OPA components are also shown.

In another embodiment, the controller 620 controls the relative optical power in the two outputs 524, 526, and the phase controllers 544 (one phase controller labelled at the top of a column of phase controllers) compensate for the relative phase difference in the two outputs 524, 526. That is, the phase controllers (e.g. phase shifters) of the OPA components are configured and operated so as to compensate for relative phase shift between the OPA components.

Figure 7:
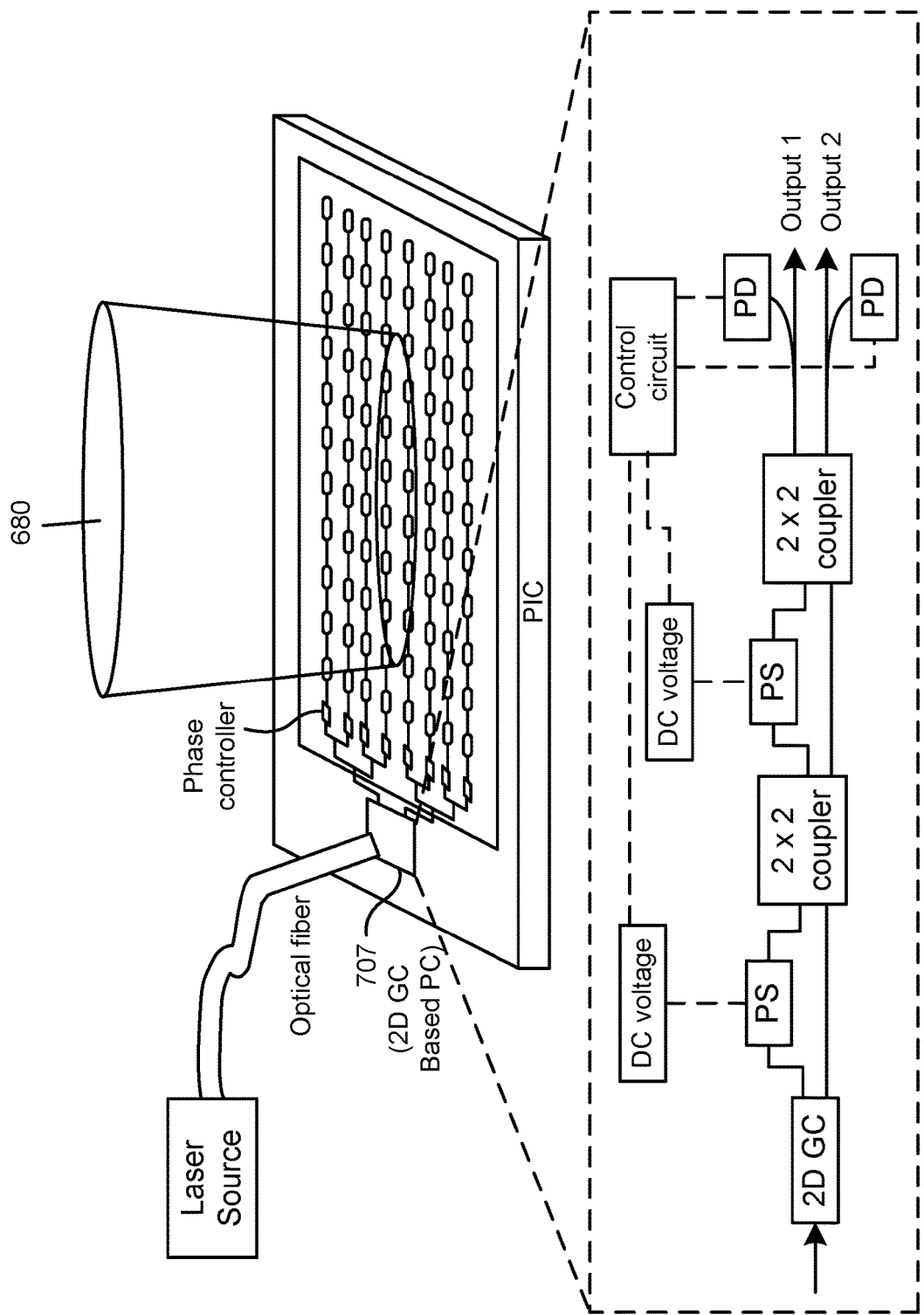
FIG. 7 illustrates an OPA including a two-dimensional grating coupler, two OPA components and a controller, in accordance with another embodiment of the present invention.

FIG. 7 illustrates an OPA according to the embodiment illustrated in FIG. 5, but in particular where the PSC is a 2D GC, and the controller takes a the same form as described in FIG. 6. The 2D GC and the controller are shown as serially connected components of a polarization controller (PC) 707. Other aspects of FIG. 7 may be the same as described above with respect to FIG. 5.

Figure 8A:
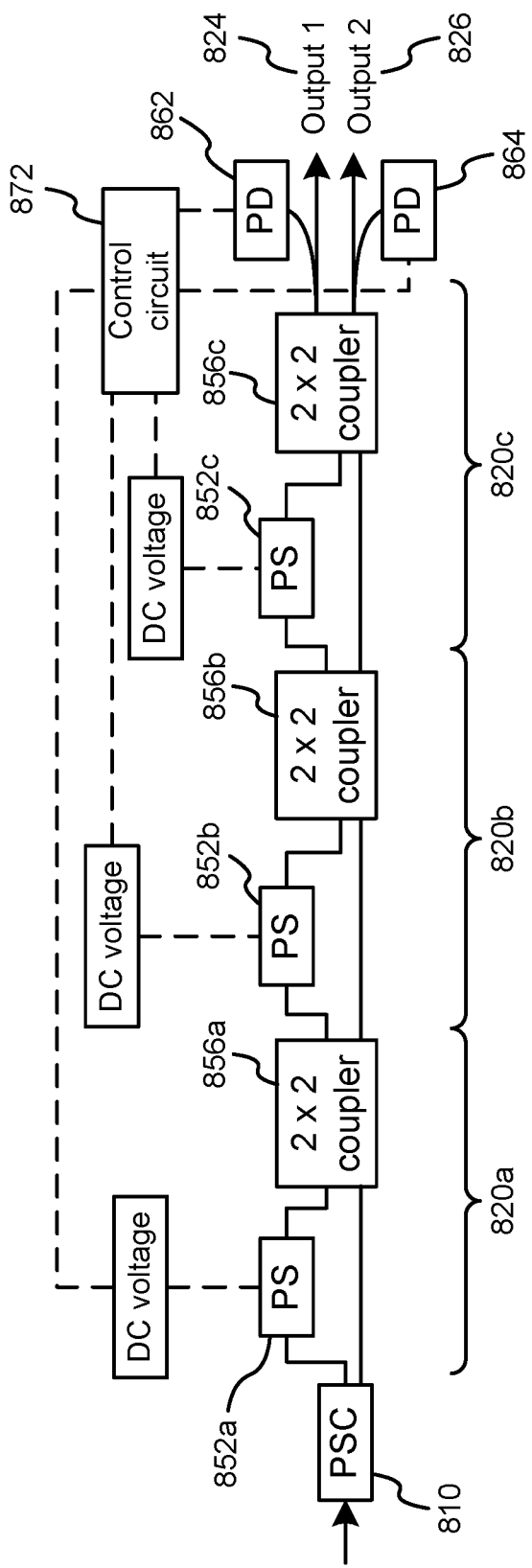
FIG. 8A illustrates an alternative controller, in accordance with an embodiment of the present invention.

FIG. 8A illustrates an alternative configuration for the PC 607 of FIG. 6 or the PC 707 of FIG. 7. The PSC 810 can be a PRS or a 2D GC. The illustrated controller includes multiple serially-connected stages 820a, 820b and 820c, each including a phase shifter (PS) 852a, 852b, 852c and a 2×2 coupler 856a, 856b, 856c, respectively. Although three stages are illustrated, four or more stages can be provided. The phase shifters 852a, 852b, 852c are controlled using a common control circuit 872 which receives input from photodetectors 862, 864 coupled to the outputs of the 2×2 coupler 856c, which also provide the controlled output lights 824, 826. The control circuit 872 generates and provides signals for controlling the phase shifters 852a, 852b, 852c based on the input from the photodetectors 862, 864, according to a predetermined feedback control scheme. Additional photodetectors, or alternative placement for the photodetectors, can be provided. The control circuit can comprise a single control circuit or multiple separate or coordinated control circuits, each configured to operate one or a subset of the phase shifters.

Figure 8B:
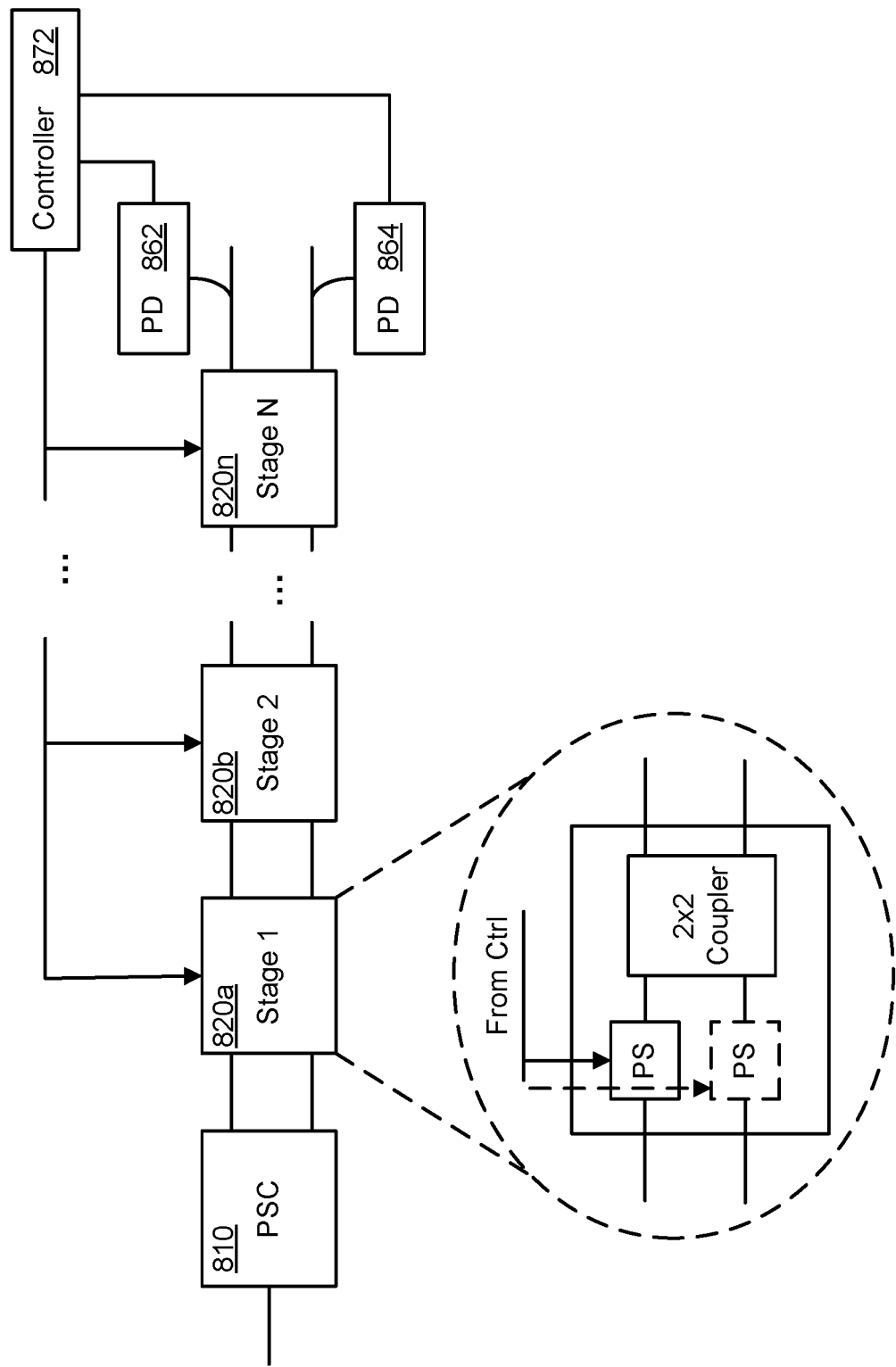
FIG. 8B illustrates another alternative controller, in accordance with an embodiment of the present invention.

FIG. 8B illustrates a multi-stage controller according to another embodiment of the present invention. The controller of FIG. 8B is as described in FIG. 8A, except that a general number N of control stages are provided. Each stage 820a, 820b, up to 820n comprises a phase shifter section and a 2×2 coupler. The phase shifter section can include one phase shifter or a pair of complementary phase shifters.

As illustrated in FIGS. 6, 7, 8A and 8B, the controller can include multiple control stages between the optical coupler and the first and second OPA components. Each of the control stages can include a respective phase shifter section configured to adjust relative phase of light received directly or indirectly from the optical coupler. The phase shifter sections are controlled by the control circuit. Each of the control stages can further include a respective optical coupler coupled to an output of the phase shifter section of the same control stage. Output from the optical coupler at a final one of the control stages is provided as the first and second controlled output lights.

FIG. 9 illustrates an OPA according to another embodiment of the present invention, in which a single OPA component 935 is used, and in which the PSC is a PRS 910. Such embodiments also relate to those shown in FIG. 1D. The PRS 910 receives source light (e.g. from a laser) at input 912. The PRS 910 and the controller 920 are shown as serially connected components of a polarization controller (PC) 907. Rather than having two output lights each connected to a OPA component (as in FIG. 2), or two output lights each connected to a half of a OPA component (as in FIG. 5), now a single output light 924 is coupled to the single OPA component 935. A beam 980 emitted by the antenna elements of the OPA component are also shown, where the beam 980 may comprise multiple sub-beams.

The controller 920 includes a first phase shifter section coupled to one or both of the first output 914 and the second output 916 of the PRS 910. The first phase shifter section is configured to adjust relative phase of the first output light and the second output light. In the illustrated embodiment, the first phase shifter section includes a single phase shifter 952a coupled to the first output 914. In other embodiments, the first phase shifter section may further include another phase shifter coupled to the second output 916, in which case the two phase shifters may operate in a complementary manner to produce a relative phase shift.

The controller 920 further includes a first optical coupler 956a coupled to an output of the first phase shifter section. The first optical coupler 956a receives and couples the first output light and the second output light provided by the PRS 910 following relative phase control by the phase shifter section. As illustrated, the first optical coupler 956a is directly coupled to the output of the phase shifter 952a and to the second output 916. When another phase shifter is coupled to the second output 916, the first optical coupler 956a may also be directly coupled to the output of this other phase shifter. The first optical coupler 956a outputs first and second intermediate coupler output lights 918, 919 which are routed to a second phase shifter section, similar to the first phase shifter section. In the present embodiment, the first intermediate coupler output light 918 is provided to a second phase shifter 952b and the second intermediate coupler output light 919 is provided directly to a second optical coupler 956b. As with the first phase shifter section, the second intermediate coupler output light 919 may alternatively be routed through another phase shifter operating in a complementary manner with the second phase shifter 952b. The output of the second phase shifter 952b is also provided to the second optical coupler 956b.

The second optical coupler 956b outputs first and second coupler output lights. In the present embodiment, the first coupler output light is provided directly as the controlled output light 924. More generally, in embodiments potentially involving multiple control stages, one output of the last serially-connected optical coupler is provided as the controlled output light 924.

The controller 920 is operated so that substantially all or, or as much as possible of, the input light is routed to a single output of the second optical coupler 956b and thus provided as the single controlled output light 924. Remaining light at the other optical coupler output may be dissipated.

The controller 920 further includes a feedback control section comprising a pair of photodetectors 962, 964, either of which may be omitted, and a control circuit 972. The photodetectors 962, 964, which may be photodiodes, are configured to monitor power of the first controlled output light 924 and the light output 958 by the other output of the second 2×2 optical coupler 956b, respectively. The photodetectors may be coupled via optical taps to the optical waveguides providing the output lights 924, 958. Signals from the photodetectors 962, 964, indicative of light detected thereby, are provided to the control circuit 972.

The control circuit 972 is configured to control relative phase adjustment applied by the first and second phase shifter sections, including by phase shifters 952a and 952b, based on output of the pair of photodetectors. The control circuit 972 may be an analog circuit, a digital circuit, or a combination thereof. Part or all of the control circuit 972 may be provided as an integrated circuit component, such as an ASIC or FPGA. The control circuit 972 is part of the overall controller 920. The control circuit 972 provides an output signal that is used for driving the first and second phase shifter sections in a predetermined manner, based on the signals from the photodetectors. In various embodiments, a DC voltage 974a, generated by the control circuit 972 or via a separate voltage generator, may be provided to the first phase shifter section for controlling the phase shifter(s) (e.g. phase shifter 952a) thereof. A DC voltage 974b, generated by the control circuit 972 or via a separate voltage generator, may be provided to the second phase shifter section for controlling the phase shifter(s) (e.g. phase shifter 952b) thereof.

As such, the controller 920, which may be a single-output controller, is operably coupled to the first output and the second output of the PRS. The controller 920 is configured to provide a controlled output light by combining the first output light and the second output light from the PRS.

Figure 10:
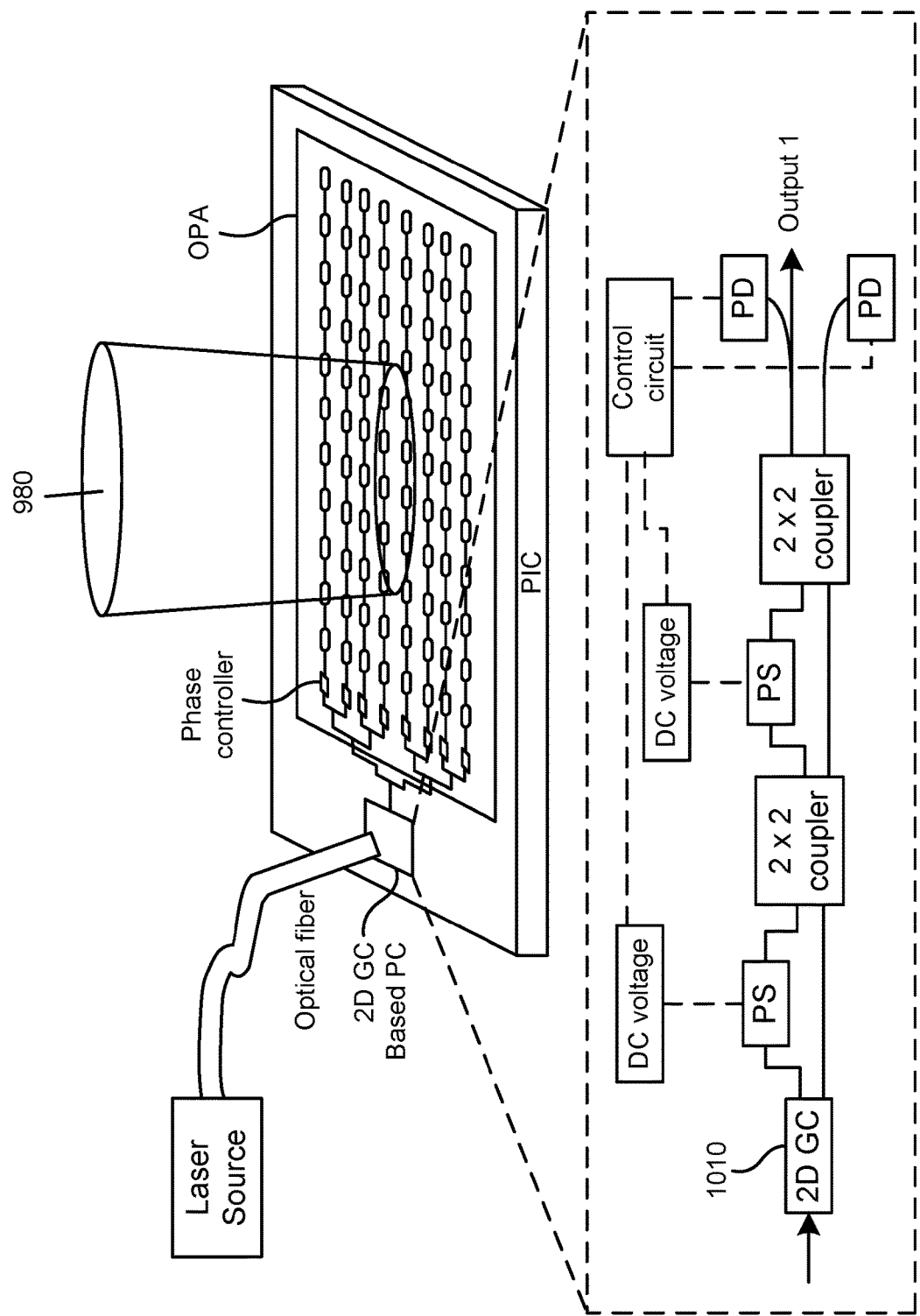
FIG. 10 illustrates an OPA including a two-dimensional grating coupler, a single OPA component and a controller, in accordance with another embodiment of the present invention.

FIG. 10 illustrates an OPA according to another embodiment of the present invention, in which a single OPA component is used as in FIG. 1D, and in which the PSC is a 2D GC. Except for the use of a 2D GC 1010 in place of a PRS 910, details of FIG. 10 are the same as in FIG. 9.

In various embodiments, the controllers of FIGS. 9 and 10 can be replaced with other controllers, such as those illustrated in FIGS. 8A and 8B, but with only a single output provided and connected to the single OPA component.

FIG. 11A illustrates a simulated far-field radiation pattern due to operation of two adjacent OPA components without interference mitigation. FIGS. 11A, 11B are polar plots indicating angles in two directions, and the scale bar indicates relative optical intensity. For example, this pattern may be achieved by operating the OPA of FIG. 3 or FIG. 4 without the HWP installed. An interference pattern occurs due to the interference between the two co-polarized OPAs. Furthermore, due to the lack of a controller, the phase difference between the two OPA components is not fixed due to the variable input light.

FIG. 11B illustrates a simulated far-field radiation pattern due to operation of two adjacent OPA components with interference mitigation. For example, this pattern may be achieved by operating the OPA of FIG. 3 or FIG. 4 with the HWP installed. Use of the HWP causes the polarizations of the two OPA components to differ, thus avoiding light interference therebetween.

Figure 12:
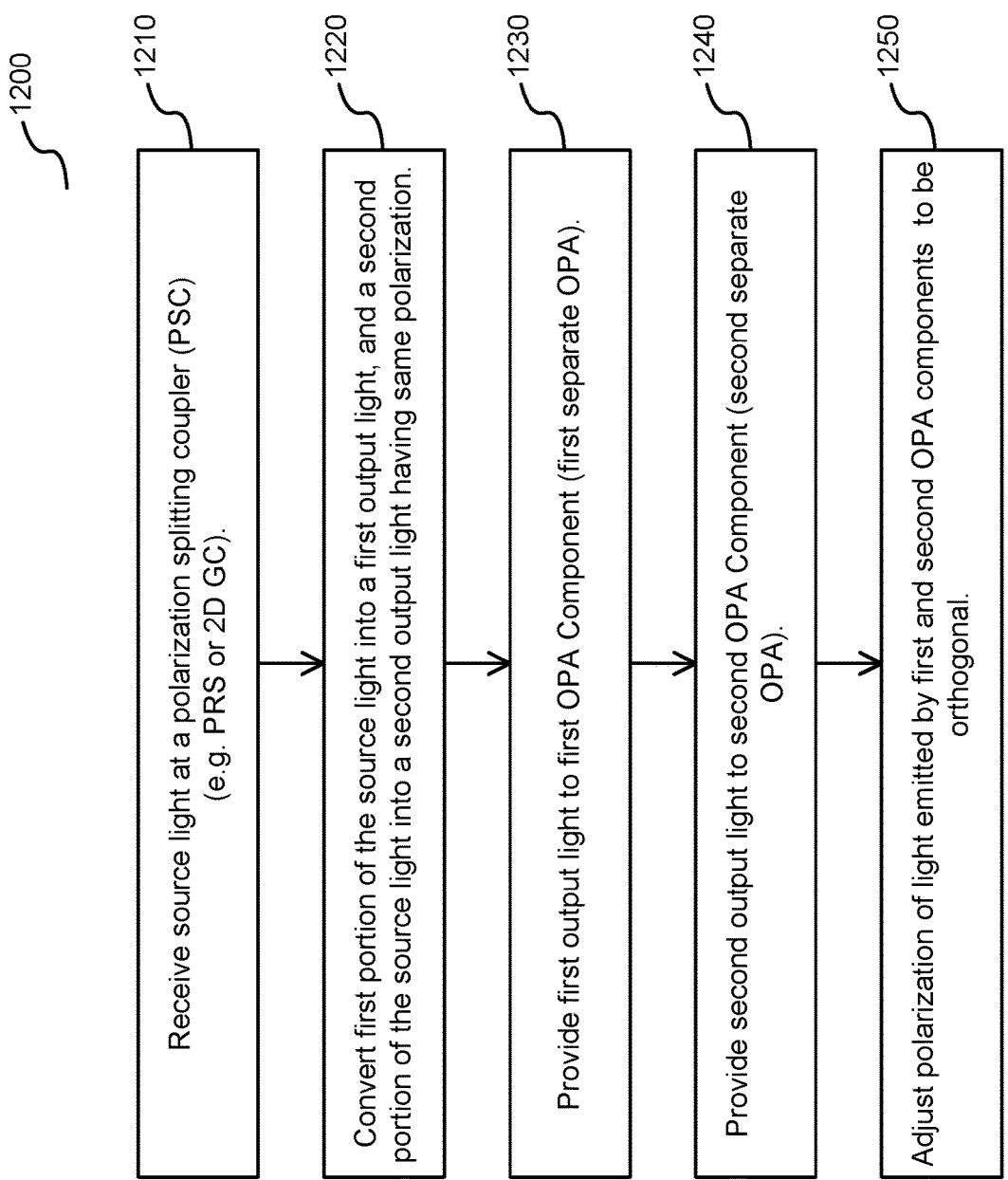
FIG. 12 illustrates a method for operating an OPA such as the OPA of FIG. 1B, the method including causing light from different OPA components to be orthogonal, in accordance with an embodiment of the present invention.

FIG. 12 illustrates a method 1200 for operating an optical phased array, according to an embodiment of the present invention. This embodiment also relates to the embodiments shown in FIG. 1B. The method includes receiving 1210 a source light at a polarization splitting coupler (PSC), such as a PRS or 2D GC. The method further includes converting 1220, using the PSC, a first portion of the source light into a first output light, and a second portion of the source light into a second output light, the first output light and the second output light having a same state of polarization. The method further includes providing 1230 the first output light to a first OPA component. The method further includes providing 1240 the second output light to a second OPA component adjacent to the first OPA component. The method further includes adjusting 1250 polarization of light emitted by one or both of the first and second OPA components so that light emitted by the first OPA component is orthogonal to light emitted by the second OPA component. This may be performed for example by rotating polarization of light emitted by antenna elements of the second OPA component by 90 degrees, for example using a HWP as described above.

Figure 13:
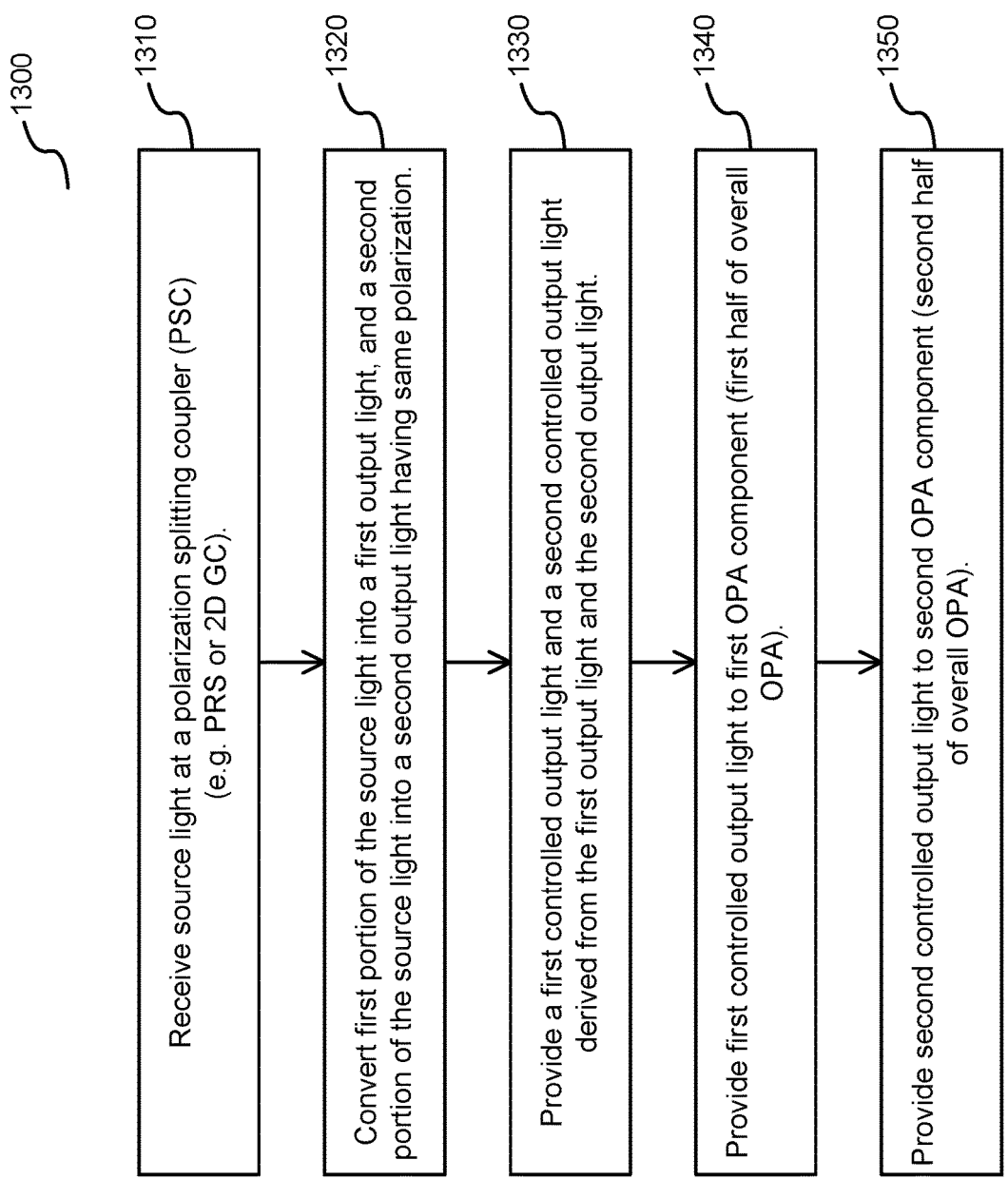
FIG. 13 illustrates a method for operating an OPA such as the OPA of FIG. 1C, the method including providing controlled light to plural OPA components, in accordance with another embodiment of the present invention.

FIG. 13 illustrates a method 1300 for operating an optical phased array, according to another embodiment of the present invention. This embodiment also relates to the embodiments shown in FIG. 1C. The method includes receiving 1310 a source light at a polarization splitting coupler (PSC). The method further includes converting 1320, using the PSC, a first portion of the source light into a first output light, and a second portion of the source light into a second output light, the first output light and the second output light having a same state of polarization. The method further includes providing 1330, using a controller, a first controlled output light and a second controlled output light derived from the first output light and the second output light. In various embodiments, the first and second controlled output lights have one or both of: controlled relative power levels and controlled relative phase. The method further includes providing 1340 the first controlled output light to a first OPA component. The method further includes providing 1350 the second controlled output light to a second OPA component adjacent to the first OPA component. The first and second OPA components may be two halves of an overall OPA component. That is, they may be operated together as a single OPA.

Figure 14:
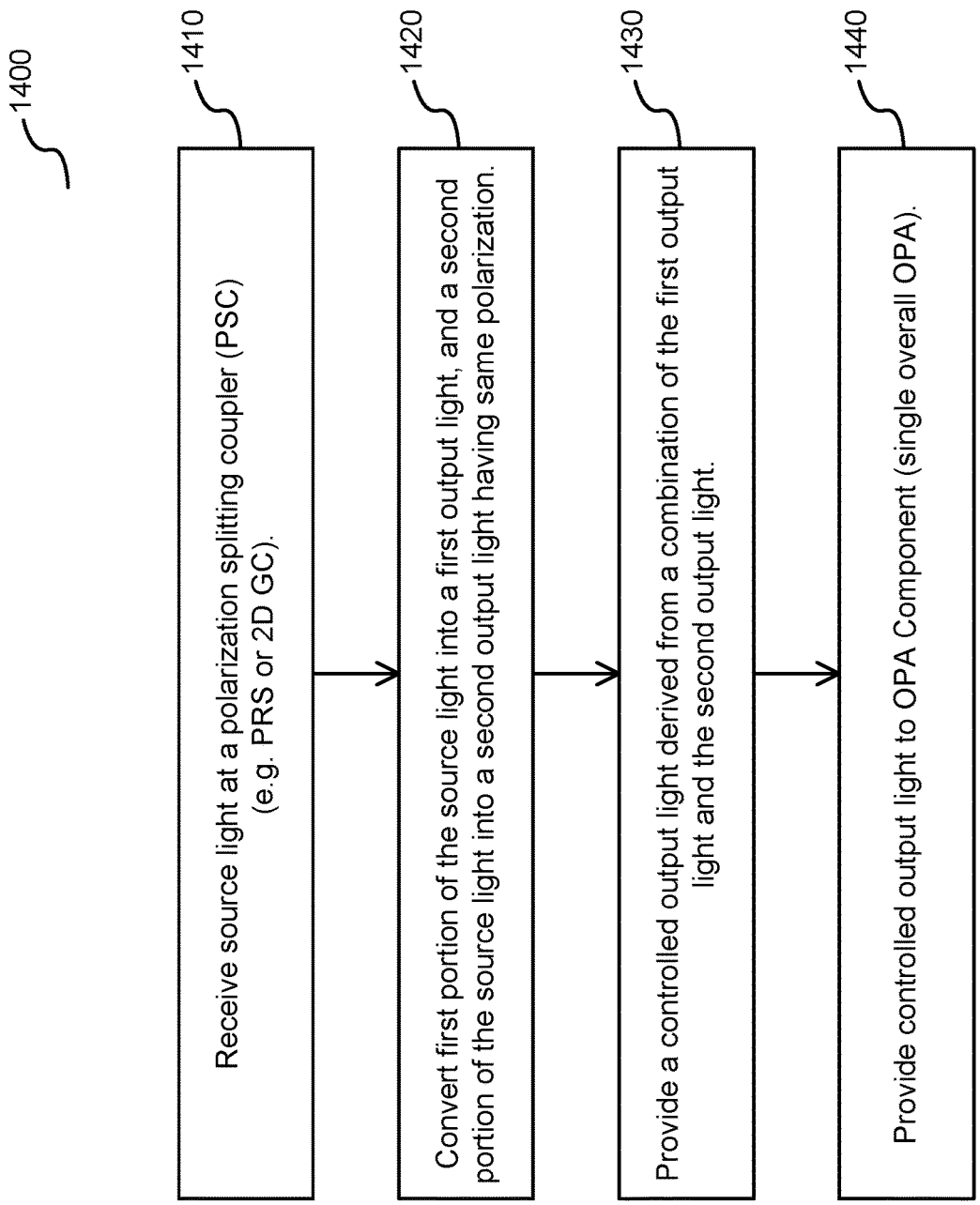
FIG. 14 illustrates a method for operating an OPA such as the OPA of FIG. 1D, the method including providing controlled light to a single OPA component, in accordance with another embodiment of the present invention.

FIG. 14 illustrates a method 1400 for operating an optical phased array, according to another embodiment of the present invention. This embodiment also relates to the embodiments shown in FIG. 1D. The method includes receiving 1410 a source light at a polarization splitting coupler (PSC). The method further includes converting 1420, using the PSC, a first portion of the source light into a first output light, and a second portion of the source light into a second output light, the first output light and the second output light having a same state of polarization. The method further includes providing 1430, using a controller, a controlled output light derived from a combination of the first output light and the second output light. The method further includes providing 1440 the controlled output light to an OPA component.

Embodiments of the present invention can be used for LIDAR applications involving an OPA disposed on a PIC platform, such as an SOI platform, having no moving parts. An example LIDAR application is for vehicles, such detectors for manually driven or self-driving cars. Other potential applications include but are not necessarily limited to biomedical imaging, three-dimensional holographic displays, and communications, such as ultra-high-data-rate communications. The polarization insensitive nature of the OPA described herein can allow for use with a simple, inexpensive light source, such as a fiber laser source. The integration of polarization desensitizing components with the OPA on the same PIC chip can provide for a compact and high density design.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An optical phased array apparatus, comprising:
   a polarization splitting coupler (PSC) configured to receive a randomly polarized source light at an input, convert a first portion of the source light into a first output light provided at a first output, and convert a second portion of the source light into a second output light provided at a second output, the first output light and the second output light having a same polarization;
   a first optical phased array (OPA) component directly or indirectly coupled to at least the first output;
   a second OPA component directly or indirectly coupled to at least the second output; and
   an interference mitigator configured to mitigate uncontrolled optical interference between output of the first OPA component and output of the second OPA component.

2. The apparatus of claim 1, wherein the first output light is provided to the first OPA component and the second output light is provided to the second OPA component, and wherein the interference mitigator comprises one or more components of the apparatus configured to cause the first and second OPAs to emit orthogonally polarized light.

3. The apparatus of claim 2, wherein the first OPA component emits a first optical beam and the second OPA component emits a second optical beam.

4. The apparatus of claim 1, wherein the first output light is provided to the first OPA component and the second output light is provided to the second OPA component, and wherein the interference mitigator comprises a half wave plate (HWP) disposed overtop of antenna elements of the second OPA component, the HWP configured to rotate polarization of light emitted by the antenna elements by 90 degrees.

5. The apparatus of claim 4, wherein the PSC comprises a polarization rotation splitter or a two-dimensional grating coupler.

6. The apparatus of claim 1, wherein the PSC comprises a polarization rotation splitter or a two-dimensional grating coupler.

7. The apparatus of claim 1, wherein the interference mitigator comprises a controller operably coupled to the first output and the second output of the PSC, the controller configured to provide a first controlled output light and a second controlled output light derived from the first output light and the second output light, the first and second controlled output lights having one or both of: controlled power levels and controlled relative phase, and the first and second controlled output lights provided to the first and second OPA components, respectively.

8. The apparatus of claim 7, wherein the first and second OPA components are operated together as an overall OPA component, and wherein there is an optical beam formed by co-polarized light emitted by the overall OPA component, said light comprising light from both the first and second OPA components.

9. The apparatus of claim 8, wherein the first and second OPA components abut along an edge, the optical beam being centered on the edge.

10. The apparatus of claim 8, wherein the controller comprises:
    a first phase shifter section coupled to one or both of the first output and the second output of the PSC, the first phase shifter section configured to adjust relative phase of the first output light and the second output light;
    a first optical coupler coupled to an output of the first phase shifter section and configured to: receive and couple the first output light and the second output light provided by the PSC following relative phase control by the first phase shifter section;
    and to output first and second outputs of the first optical coupler;
    a second phase shifter section coupled to at least one output of the first optical coupler, the second phase shifter section configured to adjust relative phase of the first and second outputs of the first optical coupler;

a second optical coupler coupled to an output of the second phase shifter section and configured to: receive and couple the first and second outputs of the first optical coupler following relative phase control by the second phase shifter section; and to output first and second coupler output lights of the second optical coupler, the first and second controlled output lights derived directly or indirectly from the first and second coupler output lights of the second optical coupler; and a feedback control section and a control circuit, the control circuit configured to control relative phase adjustment applied by the first and second phase shifter sections based on output of the feedback control section.

11. The apparatus of claim 10, wherein the controller further comprises one or more further control stages between the second optical coupler and the first and second OPA components, each one of the further control stages comprising:

a further phase shifter section configured to adjust relative phase of light received directly or indirectly from the optical coupler, the further phase shifter section controlled by the control circuit; and a further optical coupler coupled to an output of the further phase shifter section;

wherein output from the further optical coupler at a final one of the further control stages is provided as the first and second controlled output lights, respectively.

12. The apparatus of claim 7, wherein the PSC comprises a polarization rotation splitter or a two-dimensional grating coupler.

13. The apparatus of claim 7, wherein the first and second OPA components each comprise one or more phase controllers configured to compensate for relative phase shift of light between the first and second controlled output lights at inputs to respectively the first and second OPA components.

14. The apparatus of claim 1, wherein the apparatus is provided on a silicon photonics chip, and wherein the same polarization is a Transverse Electric (TE) polarization or a Transverse Magnetic (TM) polarization.

15. An optical phased array apparatus, comprising:

a polarization splitting coupler (PSC) configured to receive a randomly polarized source light at an input, convert a first portion of the source light into a first output light provided at a first output, and convert a second portion of the source light into a second output light provided at a second output, the first output light and the second output light having a same state of polarization;

a controller operably coupled to the first output and the second output of the PSC, the controller configured to provide a first controlled output light and a second controlled output light derived from the first output light and the second output light, the first and second controlled output lights having one or both of: controlled power levels and controlled relative phase;

a first optical phased array (OPA) component configured to receive the first controlled output light; and a second OPA component configured to receive the second controlled output light.

16. The apparatus of claim 15, wherein the first and second OPA components are operated together as an overall OPA component, and wherein there is an optical beam formed by co-polarized light emitted by the overall OPA component, said light comprising light from both the first and second OPA components.

17. The apparatus of claim 16, wherein the controller comprises:

two or more serially connected control stages, each one of the control stages comprising a phase shifter section in series with an optical coupler, the phase shifter section configured to adjust relative phase of light provided at a pair of inputs to said one of the control stages, the optical coupler coupled to an output of the phase shifter section, wherein a first one of the control stages is coupled to the first output and the second output of the PSC, and a last one of the control stages is configured to provide the first and second controlled output lights; and a feedback control section and a control circuit, the control circuit configured to control relative phase adjustment applied by the phase shifter sections of each one of the control stages based on output of the feedback control section.

18. The apparatus of claim 15, wherein the apparatus is provided on a silicon photonics chip, and wherein the same polarization is a Transverse Electric (TE) polarization or a Transverse Magnetic (TM) polarization.

19. The apparatus of claim 15, wherein the first and second OPA components each comprise one or more phase controllers configured to compensate for relative phase shift of light between the first and second controlled output lights at the inputs to respectively the first and second OPA components.

20. A method for operating an optical phased array, comprising:

receiving a randomly polarized source light at a polarization splitting coupler (PSC);

converting, using the PSC, a first portion of the source light into a first output light, and a second portion of the source light into a second output light, the first output light and the second output light having a same polarization;

providing the first output light to a first OPA component;

providing the second output light to a second OPA component adjacent to the first OPA component; and adjusting polarization of light emitted by one or both of the first and second OPA components so that light emitted by the first OPA component is orthogonal to light emitted by the second OPA component.

21. The method of claim 20, wherein adjusting polarization of light emitted by one or both of the first and second OPA components comprises rotating polarization of light emitted by antenna elements of the second OPA component by 90 degrees using a HWP.

22. A method for operating an optical phased array, comprising:

receiving a randomly polarized source light at a polarization splitting coupler (PSC);

converting, using the PSC, a first portion of the source light into a first output light, and a second portion of the source light into a second output light, the first output light and the second output light having a same polarization;

providing, using a controller, a first controlled output light and a second controlled output light derived from the first output light and the second output light, the first and second controlled output lights having one or both of: controlled power levels and controlled relative phase;

providing the first controlled output light to a first OPA component; and providing the second controlled output light to a second OPA component adjacent to the first OPA component.

23. The method of claim 22, further comprising operating the first and second OPA components together as overall OPA component, and wherein there is an optical beam formed by co-polarized light emitted by the overall OPA component, said light comprising light from both the first and second OPA components.

24. An optical phased array apparatus, comprising:
 a polarization splitting coupler (PSC) configured to receive a randomly polarized source light at an input, convert a first portion of the source light into a first output light provided at a first output, and convert a second portion of the source light into a second output light provided at a second output, the first output light and the second output light having a same polarization;
 a controller operably coupled to the first output and the second output of the PSC, the controller configured to provide a controlled output light by combining the first output light and the second output light; and
 an optical phased array (OPA) component configured to receive the controlled output light from the controller.

25. The apparatus of claim 24, wherein the controller comprises:
 two or more serially connected control stages, each one of the control stages comprising a phase shifter section in series with an optical coupler, the phase shifter section configured to adjust relative phase of light provided at a pair of inputs to said one of the control stages, the optical coupler coupled to an output of the phase shifter section, wherein a first one of the control stages is coupled to the first output and the second output of the PSC, and a last one of the control stages is configured to provide the controlled output light from one output of the optical coupler thereof; and
 a feedback control section comprising and a control circuit, the control circuit configured to control relative phase adjustment applied by the phase shifter sections based on output of the feedback control section.

26. The apparatus of claim 24, wherein the PSC comprises a polarization rotation splitter or a two-dimensional grating coupler.

27. The apparatus of claim 24, wherein the apparatus is provided on a silicon photonics chip, and wherein the same polarization is a Transverse Electric (TE) polarization or a Transverse Magnetic (TM) polarization.

28. A method for operating an optical phased array, comprising:
 receiving a randomly polarized source light at a polarization splitting coupler (PSC);
 converting, using the PSC, a first portion of the source light into a first output light, and a second portion of the source light into a second output light, the first output light and the second output light having a same polarization;
 providing, using a controller, a controlled output light derived from a combination of the first output light and the second output light; and
 providing the controlled output light to an OPA component.

* * * * *